United States Patent
Hayashi et al.

(10) Patent No.: US 10,447,874 B2
(45) Date of Patent: Oct. 15, 2019

(54) DISPLAY CONTROL DEVICE AND DISPLAY CONTROL METHOD FOR AUTOMATIC DISPLAY OF AN IMAGE

(75) Inventors: Naoki Hayashi, Chiba (JP); Ryota Kosakai, Tokyo (JP)

(73) Assignee: Sony Corporation, Tokyo (JP)

(*) Notice: Subject to any disclaimer, the term of this patent is extended or adjusted under 35 U.S.C. 154(b) by 800 days.

(21) Appl. No.: 13/113,469

(22) Filed: May 23, 2011

(65) Prior Publication Data

US 2012/0011464 A1 Jan. 12, 2012

(30) Foreign Application Priority Data

Jul. 7, 2010 (JP) ................................. 2010-154428

(51) Int. Cl.
| | |
|---|---|
| H04N 5/228 | (2006.01) |
| H04N 5/76 | (2006.01) |
| G09G 5/00 | (2006.01) |
| G06F 3/00 | (2006.01) |
| H04N 1/00 | (2006.01) |
| G11B 27/034 | (2006.01) |
| H04N 5/232 | (2006.01) |
| H04N 1/21 | (2006.01) |
| H04N 101/00 | (2006.01) |

(52) U.S. Cl.
CPC ..... *H04N 1/00458* (2013.01); *H04N 1/00469* (2013.01); *G11B 27/034* (2013.01); *H04N 1/00283* (2013.01); *H04N 1/2158* (2013.01); *H04N 5/23238* (2013.01); *H04N 2101/00* (2013.01)

(58) Field of Classification Search
CPC . H04N 1/2158; H04N 5/23238; G11B 27/034
USPC .......................................... 715/730, 784, 788
See application file for complete search history.

(56) References Cited

U.S. PATENT DOCUMENTS

| | | | |
|---|---|---|---|
| 5,764,276 A * | 6/1998 | Martin et al. ................. | 725/146 |
| 6,081,609 A * | 6/2000 | Narioka ........................ | 382/113 |
| 6,362,850 B1 | 3/2002 | Alsing et al. | |

(Continued)

FOREIGN PATENT DOCUMENTS

| | | |
|---|---|---|
| EP | 1 770 988 A2 | 4/2007 |
| EP | 2 271 078 A2 | 1/2011 |

(Continued)

OTHER PUBLICATIONS

Extended Search Report dated Aug. 12, 2011 in European Patent Application No. 11172083.5-1522.

(Continued)

*Primary Examiner* — Jordany Nunez
(74) *Attorney, Agent, or Firm* — Chip Law Group

(57) ABSTRACT

A display control device includes: a display signal output unit configured so as to output a display image signal on a display unit so as to execute normal display, zoom-in display, scroll display, and zoom-out display regarding data to be displayed as display operation for data to be displayed; and a control unit configured to instruct the display signal output unit to perform, regarding data to be displayed, output of a display image signal for sequentially executing zoom-in display in a scroll start position from the normal display, scroll display from the scroll start position, and zoom-out display from a scroll end position to the normal display at a display unit.

9 Claims, 23 Drawing Sheets

(56) References Cited

U.S. PATENT DOCUMENTS

| | | |
|---|---|---|
| 6,587,119 B1* | 7/2003 | Anderson et al. ............ 345/672 |
| 6,867,801 B1* | 3/2005 | Akasawa et al. .......... 348/222.1 |
| 7,206,017 B1 | 4/2007 | Suzuki |
| 2003/0052897 A1* | 3/2003 | Lin ............................... 345/619 |
| 2005/0008343 A1 | 1/2005 | Frohlich et al. |
| 2005/0128221 A1 | 6/2005 | Aratani et al. |
| 2006/0156254 A1 | 7/2006 | Satake |
| 2007/0071361 A1 | 3/2007 | Sanno |
| 2009/0021576 A1* | 1/2009 | Linder .................. G03B 37/00 348/36 |
| 2011/0001759 A1 | 1/2011 | Kim |
| 2011/0032408 A1 | 2/2011 | Sanno |
| 2014/0333718 A1* | 11/2014 | Chang ................ H04N 5/23222 348/36 |
| 2016/0277679 A1* | 9/2016 | Kimura ............. H04N 5/23238 |

FOREIGN PATENT DOCUMENTS

| | | | |
|---|---|---|---|
| GB | 2 401 272 A | 11/2004 | |
| JP | 11-146243 | 5/1999 | |
| JP | 2003-15857 A | 1/2003 | |
| JP | 2005-269362 A | 9/2005 | |
| JP | 2005-333396 | 12/2005 | |
| JP | 2007-122021 A | 5/2007 | |
| JP | 2009-268037 A | 11/2009 | |
| WO | WO 00/08853 A1 | 2/2000 | |

OTHER PUBLICATIONS

Office Action dated Feb. 18, 2014 in Japanese Patent Application No. 2010-154428.

\* cited by examiner

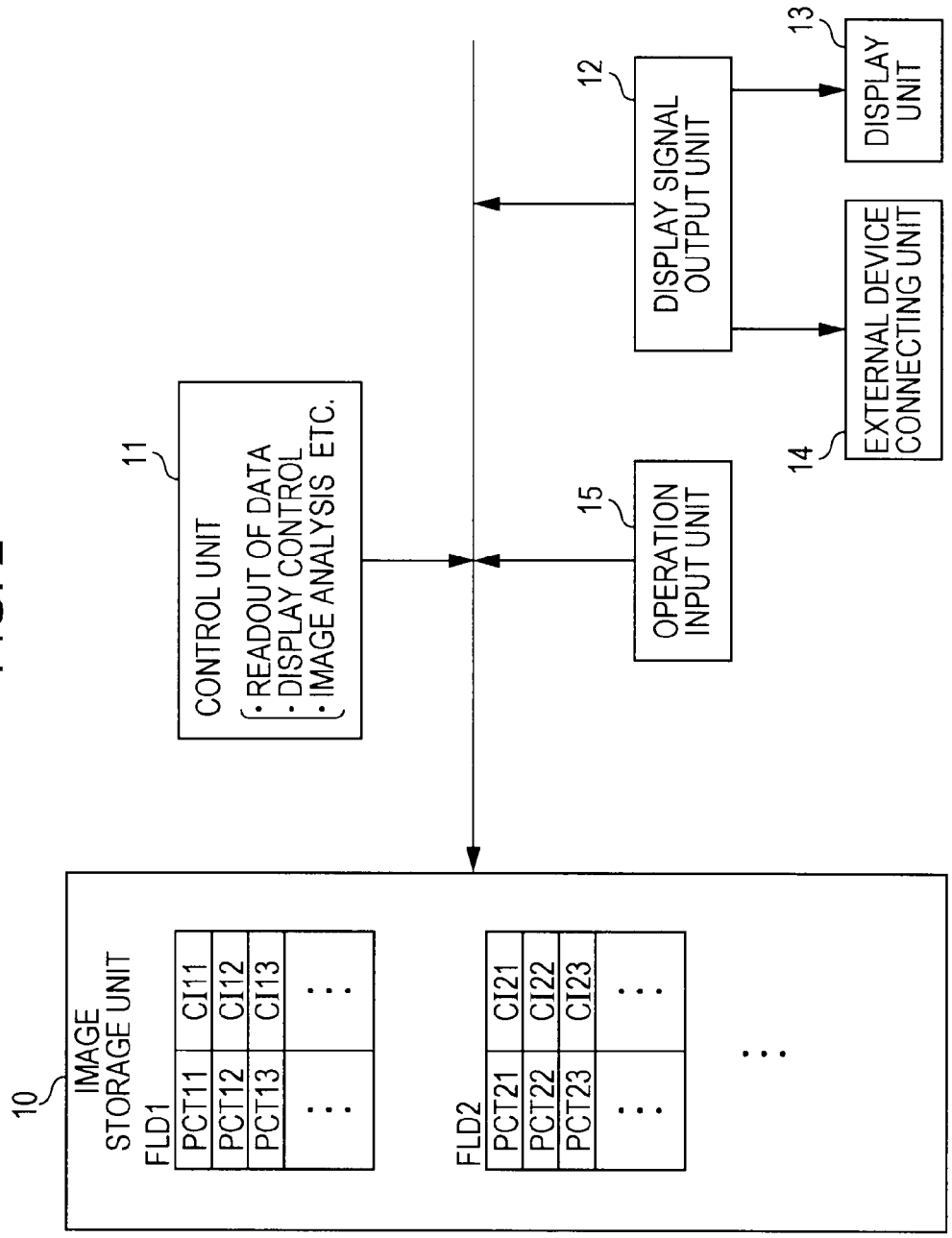

NORMAL DISPLAY

UNDER ZOOM-IN

UNDER ZOOM-IN

END OF ZOOM-IN/START OF SCROLL

UNDER SCROLL

UNDER SCROLL

UNDER SCROLL

UNDER SCROLL

END OF SCROLL/START OF ZOOM-OUT

FIG. 11A UNDER ZOOM-OUT
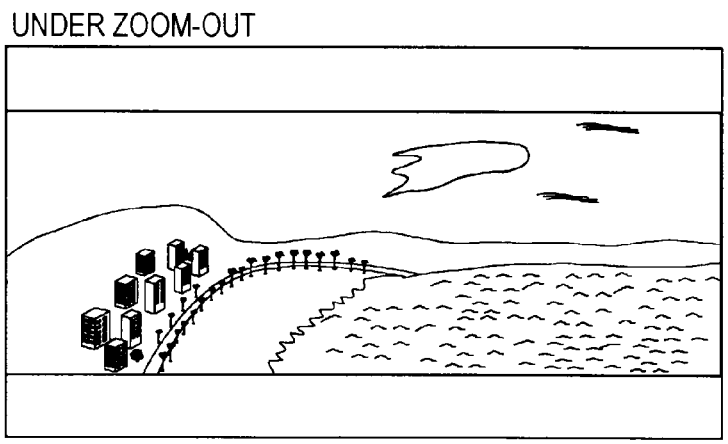
FIG. 11B UNDER ZOOM-OUT
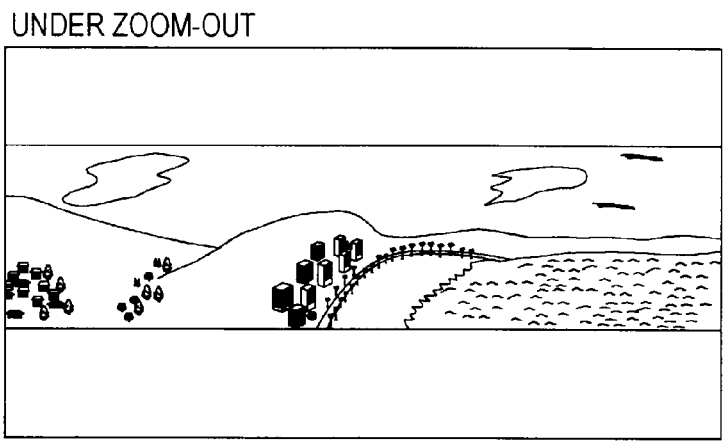
FIG. 11C END OF ZOOM-OUT/NORMAL DISPLAY
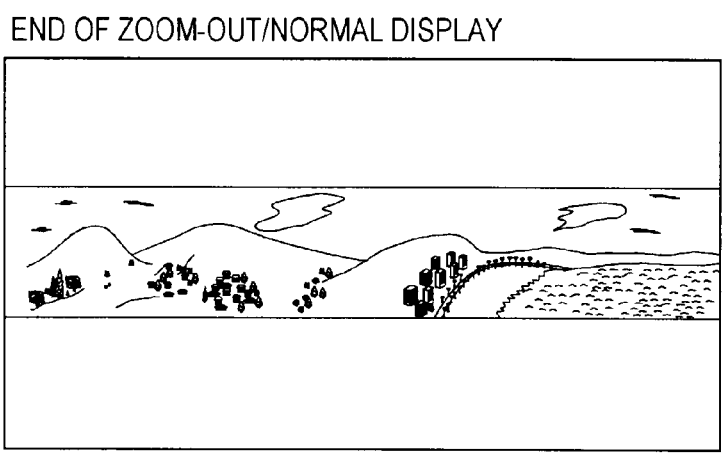

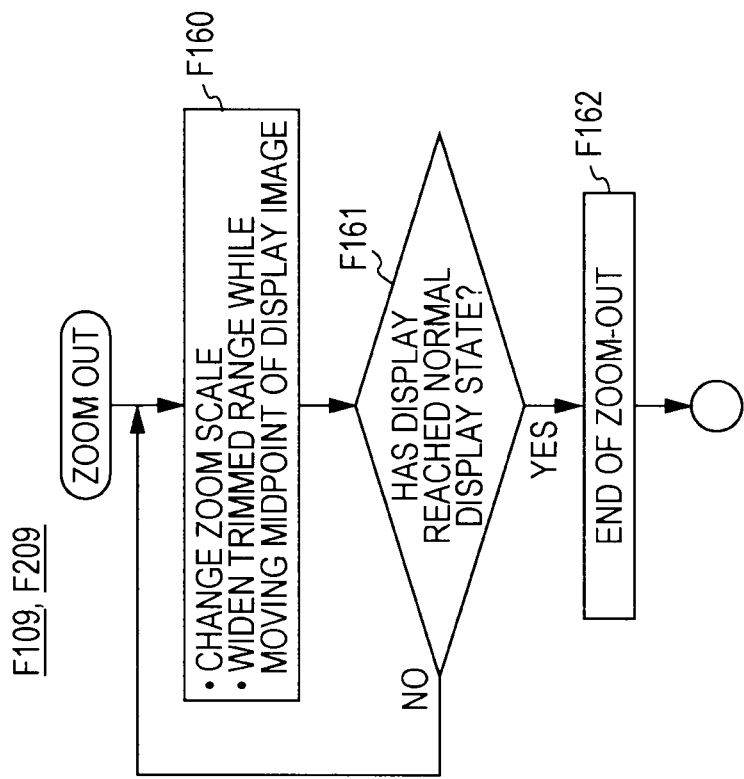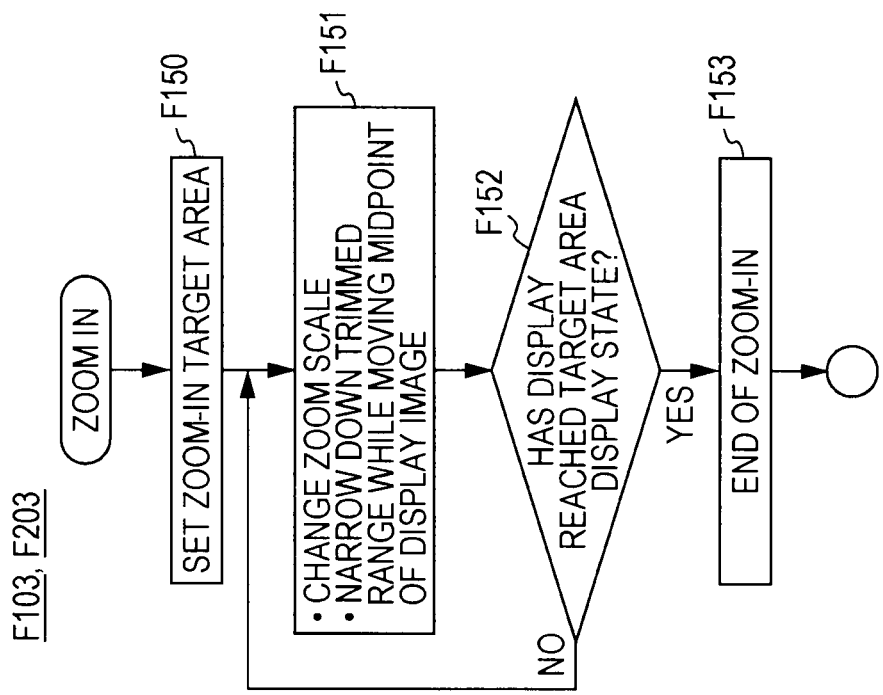

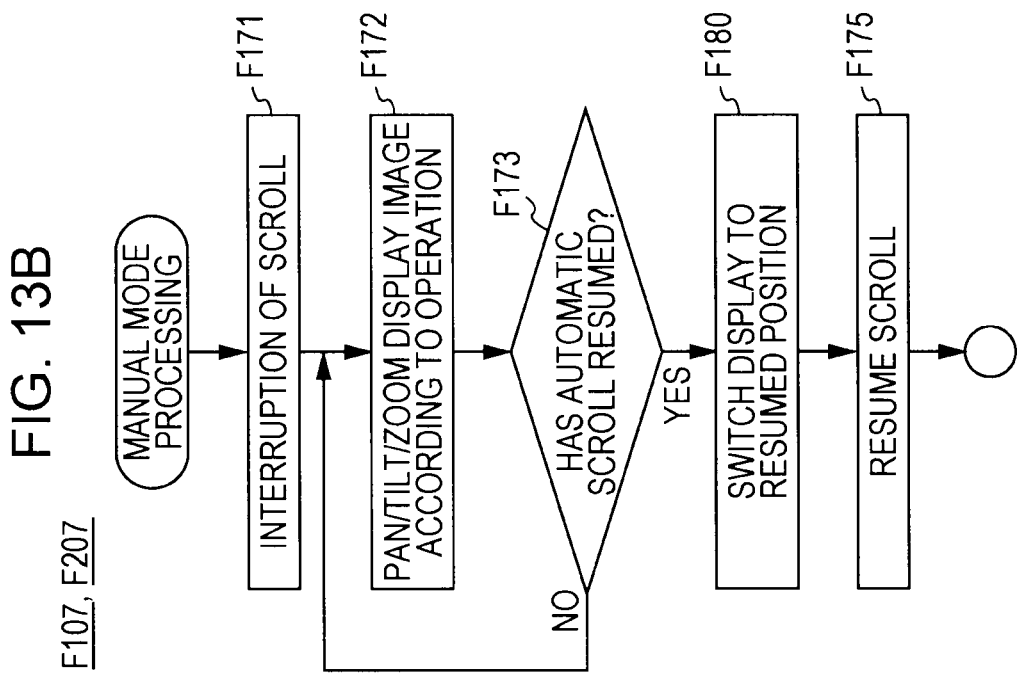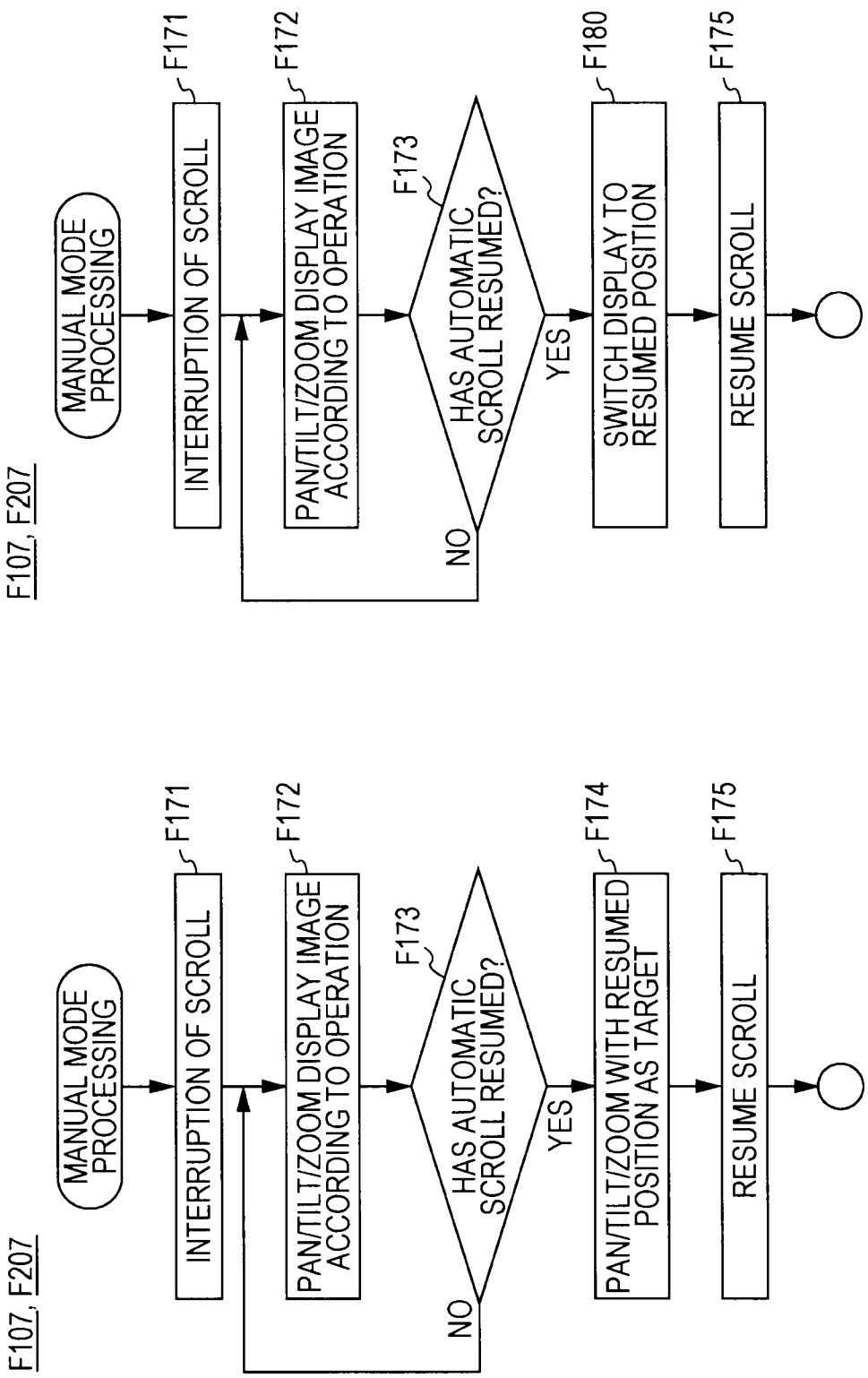

FIG. 14
(a) 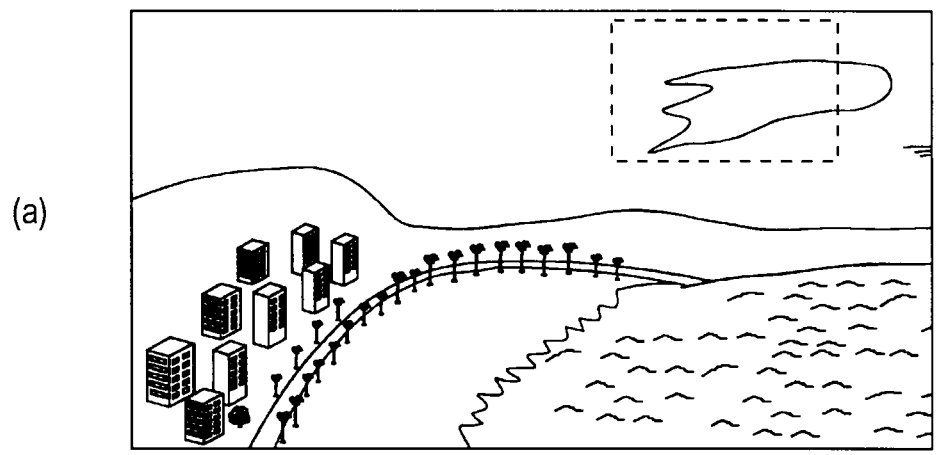
MANUAL { •PAN •TILT •ZOOM }   PAN/TILT/ZOOM TO RESUMED POSITION
(b) 

FIG. 22A NORMAL DISPLAY
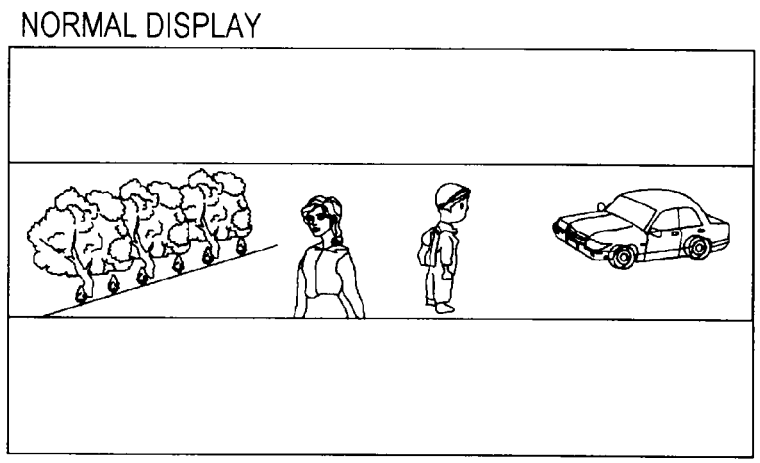
FIG. 22B IMAGE AT THE TIME OF START OF ZOOM-IN/SCROLL
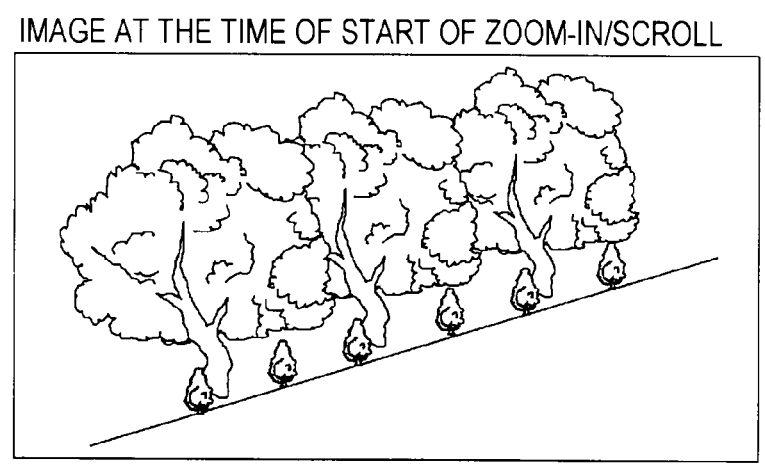
FIG. 22C IMAGE AT THE TIME OF END OF SCROLL
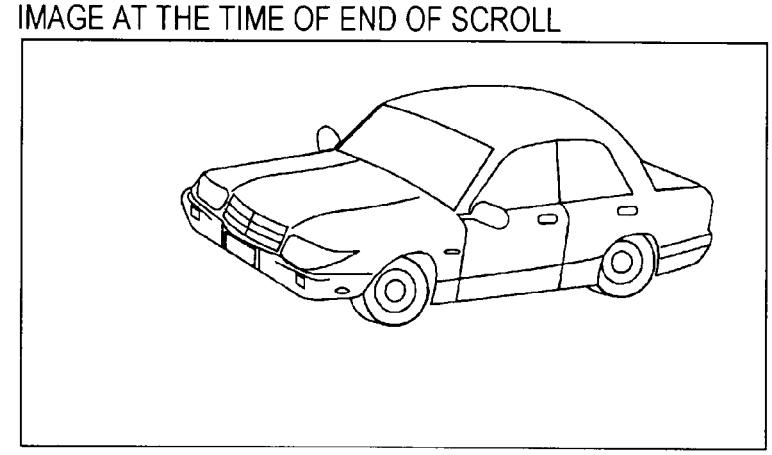

DISPLAY CONTROL DEVICE AND DISPLAY CONTROL METHOD FOR AUTOMATIC DISPLAY OF AN IMAGE

BACKGROUND

The present disclosure relates to a display control device, a display control method, and a program, and specifically relates to a technique for performing display operation suitable for display of a panoramic image.

A technique has been disclosed wherein a still image of a scene with a wide range angle is obtained by performing imaging while a user (cameraman) is moving a camera generally in the horizontal rotating direction in what is called panoramic imaging. For example, techniques relating to panoramic imaging have been disclosed in Japanese Unexamined Patent Application Publication Nos. 11-146243, and 2005-333396.

In the event of performing imaging at a digital still camera as a panoramic imaging mode, the user moves a camera in the horizontal rotating direction. At this time, with the digital still camera, a great number of still image data are obtained, and synthesizing processing is performed at a joint between subject scenes, thereby generating panoramic image data which is landscape still images. According to such panoramic images, a wide-angle scene can be obtained as a still image, which is not obtained with normal imaging.

Also, with Japanese Unexamined Patent Application Publication No. 11-146243, description has been made wherein an image obtained by panoramic imaging is displayed by scroll display.

SUMMARY

Incidentally, in the event of performing screen display regarding a panoramic image of which the transverse size is markedly longer than the longitudinal size of the image, when displaying the entire image, it is unavoidable for the size of the image to be small as to the screen size. This is because reduced display is performed so as to display the whole of the image in the horizontal direction.

On the other hand, in the event of performing scroll display as with Japanese Unexamined Patent Application Publication No. 11-146243, each portion within the image sequentially appears, but it is difficult for the user to recognize the whole of the panoramic image. Also, this takes time and effort regarding scroll operations.

It has been found to be desirable to realize display operation whereby the user can readily recognize the image content of the whole and each portion of a panoramic image, and also be amusing at the time of viewing, as automatic display operation as to still image data.

A display control device according to an embodiment of the present disclosure includes: a display signal output unit configured so as to output a display image signal on a display unit so as to execute normal display, zoom-in display, scroll display, and zoom-out display regarding data to be displayed as display operation for data to be displayed; and a control unit configured to instruct the display signal output unit to perform, regarding data to be displayed, output of a display image signal for sequentially executing zoom-in display in a scroll start position from the normal display, scroll display from the scroll start position, and zoom-out display from a scroll end position to the normal display at a display unit.

Also, in this case, the scroll start position serving as a position where the zoom-in display is performed may be a first edge position in still image data which is data to be displayed, and the scroll end position where the zoom-out display is started may be a second edge position that is an edge portion opposite of the first edge position in still image data which is data to be displayed.

Also, the first edge position may be an edge position serving as an imaging start side at the time of still image data which is data to be displayed being obtained by panoramic imaging operation.

Also, the first edge portion and the second edge portion may be image edge portions in a valid image range where the content of an imaged image existing in still image data which is data to be displayed.

Also, the control unit may instruct the display signal output unit to perform output of a display image signal to interrupt the scroll display and to perform display according to the operation input as a manual mode, when detecting operation input for instructing change of a display position while executing the scroll display.

Also, the control unit may instruct the display signal output unit to resume the scroll display according to end of the manual mode.

Also, when displaying a plurality of data to be displayed in a sequentially continuous manner, the control unit may instruct the display signal output unit to perform output of a display image signal for sequentially executing the zoom-in display, the scroll display, and the zoom-out display at the display unit regarding all or a part of the plurality of data to be sequentially displayed.

Alternatively, the control unit may instruct the display signal output unit to perform output of a display image signal for sequentially executing the zoom-in display, and the scroll display at the display unit regarding all or a part of the plurality of data to be sequentially displayed.

Alternatively, the control unit may instruct the display signal output unit to perform output of a display image signal for sequentially executing the scroll display, and the zoom-out display at the display unit regarding all or a part of the plurality of data to be sequentially displayed.

A display control device according to another embodiment of the present disclosure includes: a display signal output unit configured so as to output a display image signal on a display unit so as to execute normal display, zoom-in display, and scroll display, regarding data to be displayed as display operation for data to be displayed; and a control unit configured to instruct the display signal output unit to perform, regarding data to be displayed, output of a display image signal for sequentially executing zoom-in display in a scroll start position from the normal display, and scroll display from the scroll start position at a display unit.

When displaying a plurality of data to be displayed in a sequentially continuous manner, the control unit may instruct the display signal output unit to perform output of a display image signal for sequentially executing the zoom-in display, the scroll display, and the zoom-out display from a scroll end position to the normal display at the display unit regarding all or a part of the plurality of data to be sequentially displayed.

Alternatively, the control unit may instruct the display signal output unit to perform output of a display image signal for sequentially executing the zoom-in display, and the scroll display at the display unit regarding all or a part of the plurality of data to be sequentially displayed.

Alternatively, the control unit may instruct the display signal output unit to perform output of a display image signal for sequentially executing the scroll display, and the zoom-out display at the display unit regarding all or a part of the plurality of data to be sequentially displayed.

A display control device according to yet another embodiment of the present disclosure includes: a display signal output unit configured so as to output a display image signal on a display unit so as to execute normal display, scroll display, and zoom-out display regarding data to be displayed as display operation for data to be displayed; and a control unit configured to instruct the display signal output unit to perform, regarding data to be displayed, output of a display image signal for sequentially executing scroll display from a scroll start position, and zoom-out display from a scroll end position to the normal display at a display unit.

When displaying a plurality of data to be displayed in a sequentially continuous manner, the control unit instructs the display signal output unit to perform output of a display image signal for sequentially executing zoom-in display in a scroll start position from the normal display, the scroll display, and the zoom-out display at the display unit regarding all or a part of the plurality of data to be sequentially displayed.

Alternatively, the control unit may instruct the display signal output unit to perform output of a display image signal for sequentially executing the zoom-in display, and the scroll display at the display unit regarding all or a part of the plurality of data to be sequentially displayed.

Alternatively, the control unit may instruct the display signal output unit to perform output of a display image signal for sequentially executing the scroll display, and the zoom-out display at the display unit regarding all or a part of the plurality of data to be sequentially displayed.

A display control device according to yet another embodiment of the present disclosure includes: a display signal output unit configured so as to of output a display image signal on a display unit so as to execute normal display, zoom-in display, scroll display, and zoom-out display regarding data to be displayed as display operation for data to be displayed; and a control unit configured so as to instruct the display signal output unit of a plurality of types of display operation sequence made up by combining all or a part of zoom-in display in a scroll start position from the normal display, scroll display from the scroll start position, and zoom-out display from a scroll end position to the normal display, regarding data to be displayed, and also configured so as to instruct the display data output unit output of a display image signal at different display operation sequence between a case of displaying one piece of data to be displayed and a case of displaying a plurality of data to be displayed in a sequentially continuous manner.

A display control method according to an embodiment of the present disclosure includes: outputting, at the time of displaying data to be displayed on a display unit, a display image signal so as to sequentially automatically execute zoom-in display in a scroll start position from normal display, scroll display from the scroll start position, and zoom-out display from a scroll end position to the normal display regarding data to be displayed, to the display unit.

A program according to an embodiment of the present disclosure causing a processor, which controls, at the time of displaying data to be displayed on a display unit, output of a display image signal as to the display unit, to execute, regarding data to be displayed, zoom-in display in a scroll start position from normal display, scroll display from the scroll start position, and zoom-out display from a scroll end position to the normal display.

With the above embodiments of the present disclosure, for example, the entire image can be presented to the user as the normal display regarding data to be displayed such as still image data which is a panoramic image, or the like. Also, according to zoom-in, smooth movement to the scroll start position on display facilitates the user recognizing which portion of the entire image the scroll start position is. According to scroll, each portion can be presented to the user in detail. Also, according to zoom-out from a scroll end position to the normal display, transition of smooth display is realized.

According to an embodiment of the present disclosure, at the time of displaying data to be displayed, zoom-in, scroll, and zoom-out, or zoom-in and scroll, or scroll and zoom-out is automatically executed, whereby good recognition of the entire image, amusing image expression due to smooth image transition, and ease of recognition of each portion within an image can be presented to the user by series of display. For example, with display of a panoramic image or the like, the image content of each portion within the image can understandably be presented, and also amusing display operation at the time of viewing can be realized. Also, therefore, there is also an advantage in that operation burden is not placed on the user.

Further, at the time of sequentially displaying a plurality of data to be displayed, zoom-in, scroll, and zoom-out, or zoom-in and scroll, or scroll and zoom-out is performed as to display of each piece of data to be displayed, or these sequences are changed at the time of displaying one piece of data to be displayed, whereby amusement of viewing can further be improved.

BRIEF DESCRIPTION OF THE DRAWINGS

FIG. 2 is a block diagram of the configuration of a display control device according to an embodiment;

FIGS. 11A through 11C are explanatory diagrams of display state transition in the automatic scroll processing according to an embodiment;

FIGS. 12A and 12B are flowcharts of zoom-in/zoom-out processing according to an embodiment;

FIGS. 13A and 13B are flowcharts of manual mode processing according to an embodiment;

FIG. 14 is an explanatory diagram of display state transition in the manual mode according to an embodiment;

FIGS. 22A through 22C are explanatory diagrams of a scroll range according to an embodiment.

DETAILED DESCRIPTION OF EMBODIMENTS

Hereafter, embodiments of a display control device and a display control method regarding the present disclosure will be described in accordance with the following sequence.
1. Display Control Device according to Embodiment of Present Disclosure
2. Configuration of Imaging Apparatus as Embodiment
3. Configuration of Information Processing Device as Embodiment
4. Outline of Panoramic Image Data
5. Automatic Scroll Processing I according to First Embodiment
6. Manual Mode Processing
7. Scroll Start and End Position Examples
8. Automatic Scroll Processing II according to Second Embodiment
9. Automatic Scroll Processing III according to Third Embodiment
10. Automatic Scroll Processing IV according to Fourth Embodiment
11. Automatic Scroll Processing V according to Fifth Embodiment
12. Automatic Scroll Processing VI according to Sixth Embodiment
13. Automatic Scroll Setting Processing
14. Scroll within Valid Image Range
15. Modifications
16. Program

1. Display Control Device According to Embodiment of Present Disclosure

A display control device according to an embodiment executes display operation that is suitable and amusing for the user at the time of displaying still image data, for example, such as a panoramic image or the like on a display unit integrally or separately connected as a display object.

While details will be described later, display operation to be executed with the present embodiment is a series of display operation such as normal display of still image data→zoom-in→scroll→zoom-out→normal display.

Alternatively, display operation to be executed with the present embodiment may be a series of display operation such as normal display→zoom-in→scroll→normal display, or may be a series of display operation such as normal display→scroll→zoom-out→normal display. That is to say, scroll display is performed while performing one or both of zoom-in and zoom-out.

For example, these display operations according to the present embodiment will collectively be referred to as "automatic scroll display" for convenience of description, and control processing therefore will be referred to as "automatic scroll processing". Such a display control device for performing automatic scroll display is realized with various types of device and system.

Figure 1A:
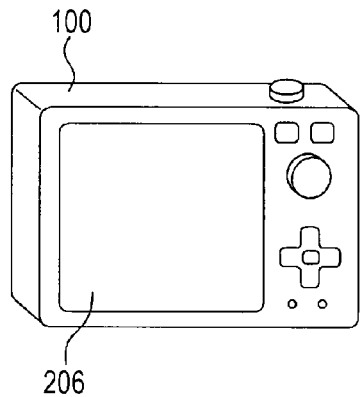
FIGS. 1A through 1E are explanatory diagrams of a device example to which an embodiment of the present disclosure can be applied.

FIGS. 1A through 1E illustrate examples of various types of applications. FIG. 1A illustrates an imaging apparatus 100 as a digital still camera. This imaging apparatus 100 has a function serving as a display control device according to an embodiment, and accordingly, automatic scroll processing can be performed at the time of performing playback display on a display panel 206 regarding imaged panoramic image data.

Specifically, the imaging apparatus 100 stores the imaged image data in a recording medium such as internal memory, memory card, or the like by imaging processing. For example, the imaging apparatus 100 has a panoramic imaging function, and stores panoramic image data.

At the time of playing the panoramic image data (image of which the aspect ratio is equal to or greater than a predetermined rate), the imaging apparatus 100 executes the automatic scroll processing, and executes automatic scroll display on the display panel 206. Thus, at the time of playing an imaged image using the imaging apparatus 100 by standalone, the user can view a panoramic image by automatic scroll display.

Figure 1B:
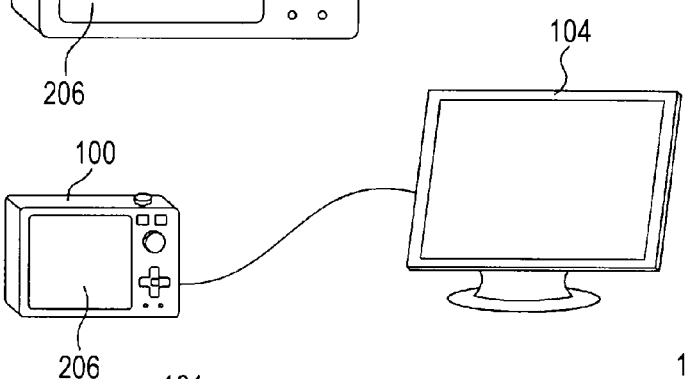

FIG. 1B illustrates an example in the event of performing playback of an image by connecting the imaging apparatus 100 to an external monitor device 104. The monitor device 104 may be a dedicated monitor device which can handle the imaging apparatus 100, or a television receiver or a monitor for personal computer may be assumed.

At the time of displaying the image imaged at the imaging apparatus 100 on the connected monitor device 104, the imaging apparatus 100 has a function for outputting a display image signal by the above automatic scroll processing to an external device, whereby the user can view automatic scroll display on the monitor device 104.

Figure 1C:
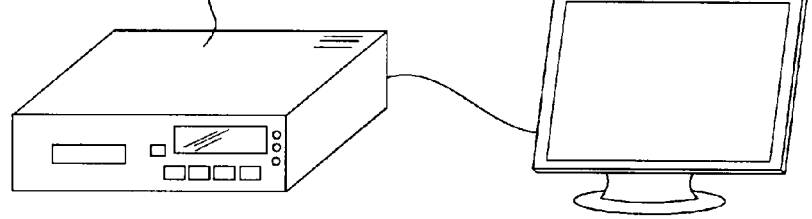

FIG. 1C illustrates an image playback device 101 and the monitor device 104. The image playback device 101 is taken as a device capable of performing playback of image data, such as a video player, still image reproducer, or the like.

The image playback device 101 plays image data recorded in a mounted portable recording medium, internal memory, or image data recorded in a recording medium such as a hard disk drive (HDD) or the like, and outputs to the monitor device 104 as display image signals.

With this image playback device 101, a memory card in which image data imaged at the imaging apparatus 100 or the like is stored, or a recording medium such as a commercial-release optical disc or the like may be mounted thereupon, or image data may be transferred from the imaging apparatus 100 and recorded in an internal HDD or the like. Further, image data downloaded via a network such as the Internet or the like may be recorded in the internal HDD or the like.

The image playback device 101 plays image data from a recording medium and outputs the display image signals by the automatic scroll processing, and accordingly, automatic scroll display is executed at the monitor device 104. Note that in the event of assuming a system using the monitor device 104 such as FIGS. 1B and 1C, the monitor device 104 may have a function serving as the display control device.

Specifically, the monitor device 104 is configured to receive transfer of image data from another device (digital still camera, video player, or the like). The automatic scroll processing may be performed at the time of playback display of image data within the monitor device 104.

Figure 1D:
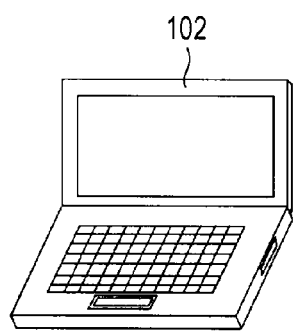

FIG. 1D illustrates a personal computer 102. For example, a memory card in which image data imaged at the imaging apparatus 100 is stored, or a recording medium such as a commercial-release optical disc or the like may be mounted on the personal computer 102, or image data may be transferred from the imaging apparatus 100 and recorded in the internal HDD or the like as a data file. Further, image data downloaded via a network such as the Internet or the like may be recorded in the internal HDD or the like.

With the personal computer 102, at the time of playing such image data by predetermined application software, this application software performs the automatic scroll processing, whereby automatic scroll display at a monitor display can be executed.

Figure 1E:
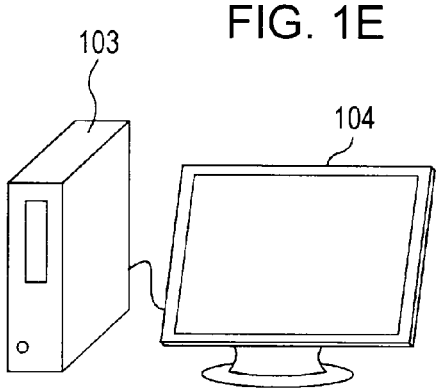

FIG. 1E illustrates a game machine 103. With the game machine 103 as well, in the same way as with the personal computer 102, captured image data, or image data recorded in a mounted optical disc or memory card can be played. At this time, with a program for display output, the automatic scroll processing is performed, whereby automatic scroll display at the connected monitor device 104 can be executed, for example.

Though the above arrangement is merely an exemplification, various realization examples can be assumed as an embodiment of the present disclosure, for example, like these. An embodiment of the present disclosure may be realized with a device, for example, such as various types of AV (Audio-Visual) machines, cellular phones, PDAs, and so forth.

In the event of realizing the present embodiment at various types of devices, a configuration example to be provided to these devices or systems will be shown in FIG. 2. FIG. 2 illustrates an image storage unit 10, a control unit 11, a display signal output unit 12, a display unit 13, an external device connecting unit 14, and an operation input unit 15.

The image storage unit 10 is an area in which various types of image data are stored. This image storage unit 10 may be configured as a portable recording medium, for example, such as a memory card, an optical disc, or the like, and a playback unit thereof, may be configured as an HDD, or may be configured as internal memory (RAM, flash memory, or the like). Also, the image storage unit 10 may be configured as a connected external device, or an external device capable of communication via a network or the like.

A great number of image data is stored in the image storage unit 10 in increments of folders. For example, image data PCT11, PCT12, and so on are included in a folder FLD1. Also, image data PCT21, PCT22, and so on are included in a folder FLD2.

With each folder, not only image data PCT but also additional information of image data thereof is stored in a correlated manner. For example, environment information CI (CI11, CI12, and so on) is stored corresponding to image data PCT (PCT11, PCT12, and so on) respectively. The additional information is various types of information, for example, such as imaging date, imaging device information, download source information, image attribute information such as image size and resolution and so forth, copy light control information, and so forth. In particular, in the event of panoramic image data, information indicating that the movement direction of imaging visual field at the time of panoramic imaging is from right to left, from left to right, from top to bottom, from bottom to top, or the like is included as panoramic imaging direction information. This panoramic imaging direction information can be added by a sensor for detecting visual field direction movement being provided to the imaging apparatus 100 which performed panoramic imaging.

Note that the folder management such as described above is an example, any kind of management mode (folder structure, directory structure, etc.) of image data PCT and additional information CI may be sufficient.

The control unit 11 includes one or more CPUs (Central Processing Units), a control circuit, re-arrangeable hardware used for control, and so forth. The control unit 11 performs data readout processing, display control processing, image analysis processing, operation input detection processing, and so forth.

The data readout processing is processing for reading out image data PCT to be played and additional information CI from the image storage unit 10.

The display control processing is control processing for executing playback display of image data that selected by the user's operations, slide show display for sequentially performing playback display of a plurality of image data, or the like, for example. In the event of the present example, the control unit 11 is allowed to perform automatic scroll processing as one of the display controls.

The image analysis processing is processing for analyzing image data to determine the content of the image. For example, determination is made such as whether the image is a scenery image or an image including a person, or the like. Also, processing may be performed wherein a position within an image where there is a particular subject, such as a person, face, particular object, or the like, is determined. The control unit 11 can perform instructions of a zoom-in position, or instructions of a scroll direction based on this analysis result.

The operation input detection processing is processing for detecting the content of the user's operations from the operation input unit 15. The control unit 11 performs control processing stipulated by an internally held program according to the detected user's operations.

The display signal output unit 12 receives transfer regarding image data to be played and displayed, and outputs display image signals in accordance with instructions by the display control processing of the control unit 11.

Therefore, processing such as reduction/enlargement, trimming, rotation, or the like is performed as to image data supplied as a display object, whereby display image signals can be generated.

Thus, for example, display image signals for realizing normal display, zoom-in display, scroll display, zoom-out display, or the like are generated regarding image data which is a display object according to control by the automatic scroll processing of the control unit 11.

The generated display image signals are displayed and output on the integral or separate display unit 13, or output and displayed on an external monitor device from the external device connecting unit 14.

The display signal output unit 12 may change display parameters such as luminance change, color balance change, contrast change, and so forth, or perform image synthesizing processing of a character image, an image picture, and so forth, as processing for giving image effects as a display image.

The operation input unit 15 is a unit for the user performing various types of operation input. The operation input unit 15 is configured so as to have operating elements such as a key, a dial, and so forth, for example, or configured as a reception unit of an operation signal of a remote controller, or the like.

The operation information by the operation input unit 15 is detected by the control unit 11, and the control unit 11 performs operation control according to operations. For example, the control unit 11 performs determination of an image to be displayed, execution control of a slide show, and so forth according to the operation information. For example, the imaging apparatus 100, image playback device 101, personal computer 102, game machine 103, or the like, shown in FIGS. 1A through 1E, have the configuration such as described above, whereby operations as the present embodiment can be realized at each device.

Specifically, the control unit 11 is equivalent to the control unit referred to in the Summary of the present disclosure, and the display signal output unit 12 is equivalent to the display signal output unit referred to in the Summary of the present disclosure. At least the configurations equivalent to the control unit 11 and the display signal output unit 12 have to be implemented by hardware or software as a device equivalent to the present embodiment.

2. Configuration of Imaging Apparatus as Embodiment

Hereafter, a device configuration example will be described as a more specific embodiment. First, description will be made regarding a configuration example in the event that an embodiment of the present disclosure has been applied to the imaging apparatus 100 as a digital still camera.

Figure 3:
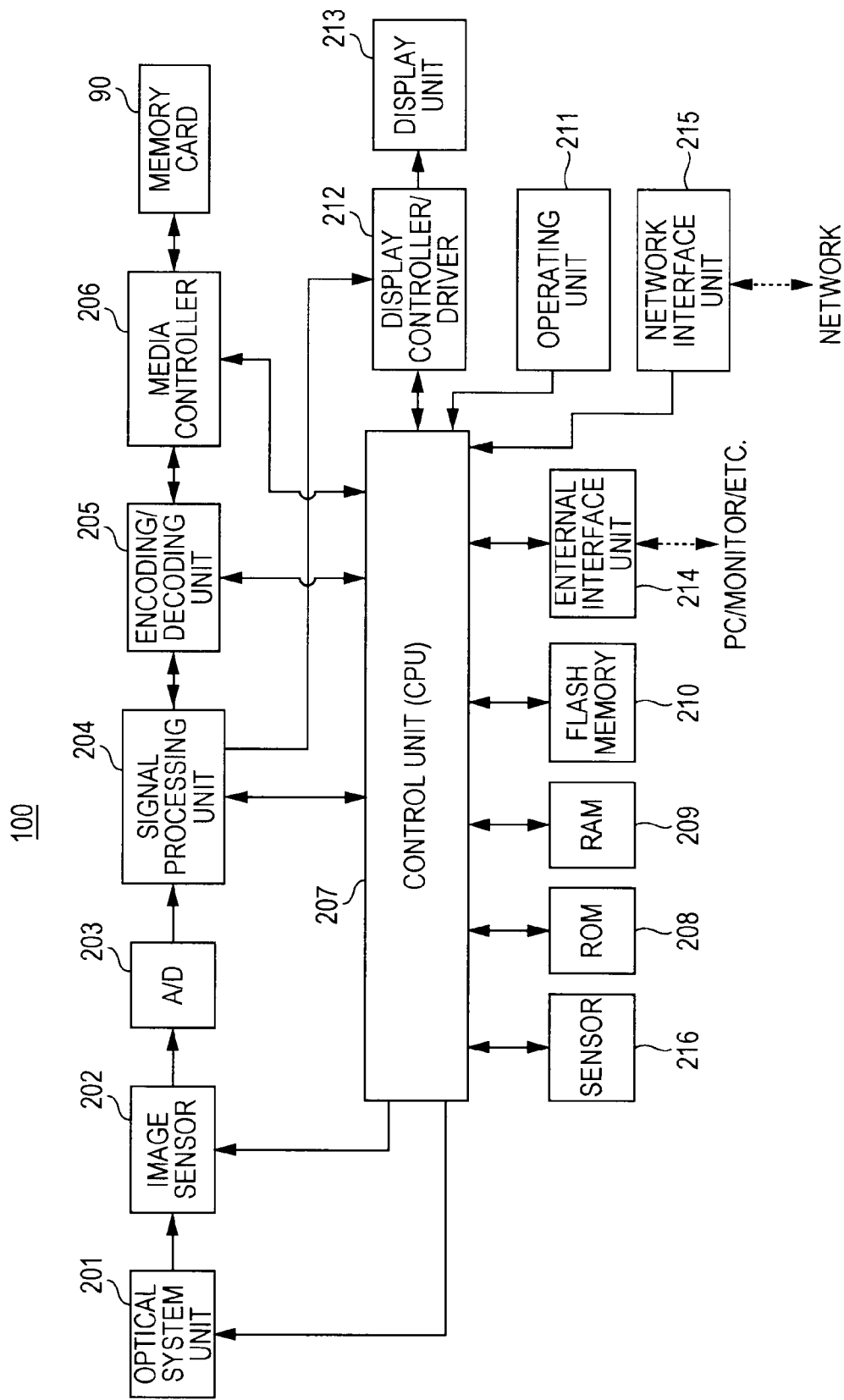
FIG. 3 is a block diagram of an imaging apparatus equivalent to the display control device according to an embodiment.

The configuration of the imaging apparatus 100 according to an embodiment will be described with reference to FIG. 3. FIG. 3 is a block diagram illustrating an internal configuration example of the imaging apparatus 100.

An optical system unit 201 is configured of a predetermined number of lens groups for imaging including, for example, a zoom lens, a focus lens, and so forth, and a diaphragm and so forth, and forms an image on the light receiving surface of an image sensor 202 with incident light as imaging light.

Also, with the optical system unit 201, driving mechanism units for driving the above zoom lens, focus lens, diaphragm, and so forth are also provided. With these driving mechanism units, operations thereof are controlled by what we might call camera control, for example, such as zoom (field angle) control, automatic focus adjustment control, automatic exposure control, and so forth that a control unit 207 executes.

The image sensor 202 performs photoelectric conversion what we might call to convert imaging light obtained at the optical system unit 201 into electric signals. Therefore, the image sensor 202 receives the imaging light from the optical system unit 201 at the light receiving surface of a photoelectric conversion element, and sequentially outputs signal charge accumulated according to received light intensity at predetermined timing. Thus, electric signals (imaged signals) corresponding to the imaging light are output.

The photoelectric conversion element (imaging device) employed as the image sensor 202 is not restricted to any particular one, and with this arrangement a CMOS (Complementary Metal Oxide Semiconductor) sensor, a CCD (Charge Coupled Device), or the like may be used, for example. Also, in the event of employing a CMOS sensor, a configuration including an analog-to-digital converter equivalent to a next-described A/D converter 203 may be employed as a device (part) equivalent to the image sensor 202. The imaged signal output from the image sensor 202 is input to the A/D converter 203, and accordingly converted into a digital signal, and input to a signal processing unit 204.

The signal processing unit 204 is configured of, for example, a DSP (Digital Signal Processor), and subjects the digital imaged signal output from the A/D converter 203 to predetermined signal processing in accordance with the program.

The signal processing unit 204 performs capturing in increments equivalent to one still image (frame image) regarding the digital imaged signal output from the A/D converter 203. The captured imaged signal in increments of still images is then subjected to predetermined signal processing, thereby generating imaged image data (imaged still image data) that is image signal data equivalent to one still image.

Also, the signal processing unit 204 may execute later-described subject detection processing, or image analysis processing for composition processing by taking advantage of the imaged image data thus obtained.

Also, the signal processing unit 204 performs, in the event of the panoramic image mode, processing for generating panoramic image data by synthesizing a great number of frame images obtained by panoramic imaging operation.

In the event of recording the imaged image data generated at the signal processing unit 204 in a memory card 90 which is a recording medium, imaged image data corresponding to one still image is output from the signal processing unit 204 to an encoding/decoding unit 205, for example.

After executing compression encoding regarding imaged image data in increments of still images output from the signal processing unit 204 by a predetermined still image compression coding system, the encoding/decoding unit 205 adds a header thereto or the like according to control of the control unit 207, and converts into a predetermined compressed image data format. The encoding/decoding unit 205 then transfers image data thus generated to a media controller 206.

The media controller 206 writes and records the transferred image data in the memory card 90 in accordance with the control of the control unit 207. The memory card 90 in this case is a recording medium having a card-format outer shape conforming to a predetermined standard for example, and internally having a nonvolatile semiconductor storage element such as flash memory.

As for a recording medium in which image data is recorded, a type or format or the like other than the above memory card may be employed. There may be employed various types of recording medium, for example, such as optical disc, hard disk, a semiconductor memory chip such as non-detachable attached flash memory chip, hologram memory, and so forth.

Also, the imaging apparatus 100 causes a display unit 213 to execute image display by taking advantage of imaged image data obtained at the signal processing unit 204, whereby a through image what we might call, which is an image under imaging, can be displayed.

For example, the signal processing unit 204 captures the imaged signal output from the A/D converter 203 as described above to generate imaged image data equivalent to one still image, but imaged image data equivalent to a frame image of a moving image is sequentially generated by continuing this operation. The signal processing unit 204 then transfers the imaged image data thus sequentially generated to a display controller/driver 212 in accordance with the control of the control unit 207.

The display controller/driver 212 generates a driving signal for driving the display unit 213 based on the imaged image data input from the signal processing unit 204 as described above, and outputs to the display unit 213. Thus, with the display unit 213, images based on the imaged image data in increments of still images are sequentially displayed on the display unit 213. When the user views this, images being imaged at this time are displayed on the display unit 213 in a moving image style. That is to say, a through image is displayed.

Also, the imaging apparatus 100 may play the image data recorded in the memory card 90, and display the image thereof on the display unit 213.

Therefore, the control unit 207 specifies the image data to command the media controller 206 to perform readout of data from the memory card 90. In response to this command, the media controller 206 accesses an address on the memory card 90 where the specified image data is recorded to execute readout of data, and transfers the readout data to the encoding/decoding unit 205.

The encoding/decoding unit 205 extracts entity data serving as compressed still image data from the imaged image data transferred from the media controller 206, for example, in accordance with the control of the control unit 207. The encoding/decoding unit 205 then executes decoding processing as to compression encoding regarding this compressed still image data, obtains imaged image data corresponding to one still image, and transfers this imaged image data to the display controller/driver 212. Thus, the image of the imaged image data recorded in the memory card 90 is played and displayed on the display unit 213.

In this case, the control unit 207 serves as the control unit 11 in FIG. 2, the display controller/driver 212 serves as the display signal output unit 12 in FIG. 2, and the automatic scroll processing is executed, whereby automatic scroll display can be performed on the display unit 213. An example of this is display operation described in FIG. 1A.

Also, a user interface image (operation image) may be displayed on the display unit 213 along with the above through image, a playback image of image data, or the like.

In this case, the control unit 207 generates image data for display as a user interface image according to the operation state at this time for example, and outputs this to the display driver 212. Thus, the user interface image is displayed on the display unit 213.

This user interface image may be displayed on the display screen of the display unit 213 separately from a monitor image or the playback image of imaged image data such as a particular menu screen or the like. Also, the user interface image may be displayed so as to be superimposed or synthesized on a portion on a monitor image or the playback image of imaged image data.

The control unit 207 is configured of a CPU (Central Processing Unit), and makes up a microcomputer along with ROM 208 and RAM 209 and so forth.

In the event of the present embodiment, the control unit 207 can perform control processing relating to automatic scroll display described at the control unit 11 in FIG. 2, in addition to control of the imaging function of the normal imaging apparatus 100.

Also, the control unit 207 performs processing for panoramic imaging, i.e., instructions of imaging or synthesizing processing of a great number of frame images which are panorama images, and processing such as parameter settings in the panoramic imaging mode.

In addition to the program that the CPU serving as the control unit 207 has to execute, various types of setting information relating to the operations of the imaging apparatus 100, and so forth are stored in the ROM 208, for example. The RAM 209 is used as a main storage device for the CPU.

Also, flash memory 210 in this case is provided as a nonvolatile storage region used for storing various types of setting information and so forth that have to be changed (rewritten) according to the user's operations, operation history, or the like.

An operating unit 211 collectively denotes various types of operating elements provided to the imaging apparatus 100, and an operation information signal output unit for generating an operation information signal according to an operation performed as to these operating elements, and outputting to the control unit 207. As for the operating elements, a release button, a power button, a mode button, a zoom operation button, an operating dial, and so forth are provided.

Also, in the event that the display unit 213 is formed as a touch panel, a touch sensor unit thereof becomes a specific example of this operating unit 211. Further, a reception unit of the command signal from the remote controller serves as an example of the operating unit 211.

The control unit 207 executes predetermined processing according to the operation information signal input from the operating unit 211. Thus, the operations of the imaging apparatus 100 according to the user's operations are executed.

An external interface unit 214 performs transmission/reception of various types of data with an external device via a predetermined cable in accordance with signal standard, for example, such as USB (Universal Serial Bus) or the like. It goes without saying that this interface is not restricted to the USB system, and there may be employed an external interface conforming to other standard such as IEEE (Institute of Electrical and Electronics Engineers) 1394 system or the like.

Also, the external interface unit 214 may be configured not by a cable transmission system but by a wireless transmission system such as infrared transmission, short distance wireless communication, or the like.

The imaging apparatus 100 can perform data transmission/reception with various types of device such as the personal computer 102, game machine 103, and so forth, via the external interface unit 214. For example, the imaging apparatus 100 can transfer imaged image data PCT and additional information CI to an external device.

Alternatively, the imaging apparatus 100 is connected to the monitor device 104 via the external interface unit 214, whereby display of an imaged image can be executed. Specifically, the above display controller/driver 212 outputs display image signals to the monitor device 104 via the external interface unit 214.

At this time, if the display controller/driver 212 is configured so as to output display image signals for automatic scroll display based on the instructions of the control unit 207, automatic scroll display in the mode described in FIG. 1B is executed on the monitor device 104.

A network interface unit 215 performs communication processing for accessing an external server device, a website, or the like via a network, for example, such as the Internet or the like. The control unit 207 may obtain image data and so forth from a predetermined server device or the like by network communication via the network interface unit 215.

A sensor unit 216 integrally indicates various types of sensors to be mounted on the imaging apparatus 100. For example, an external light light-quantity sensor, a speed sensor, an acceleration sensor, a position sensor, and so forth are assumed to be mounted as the sensor unit 216. For example, panoramic imaging direction information may be generated from detection information of the acceleration sensor.

3. Configuration of Information Processing Device as Embodiment

Figure 4:
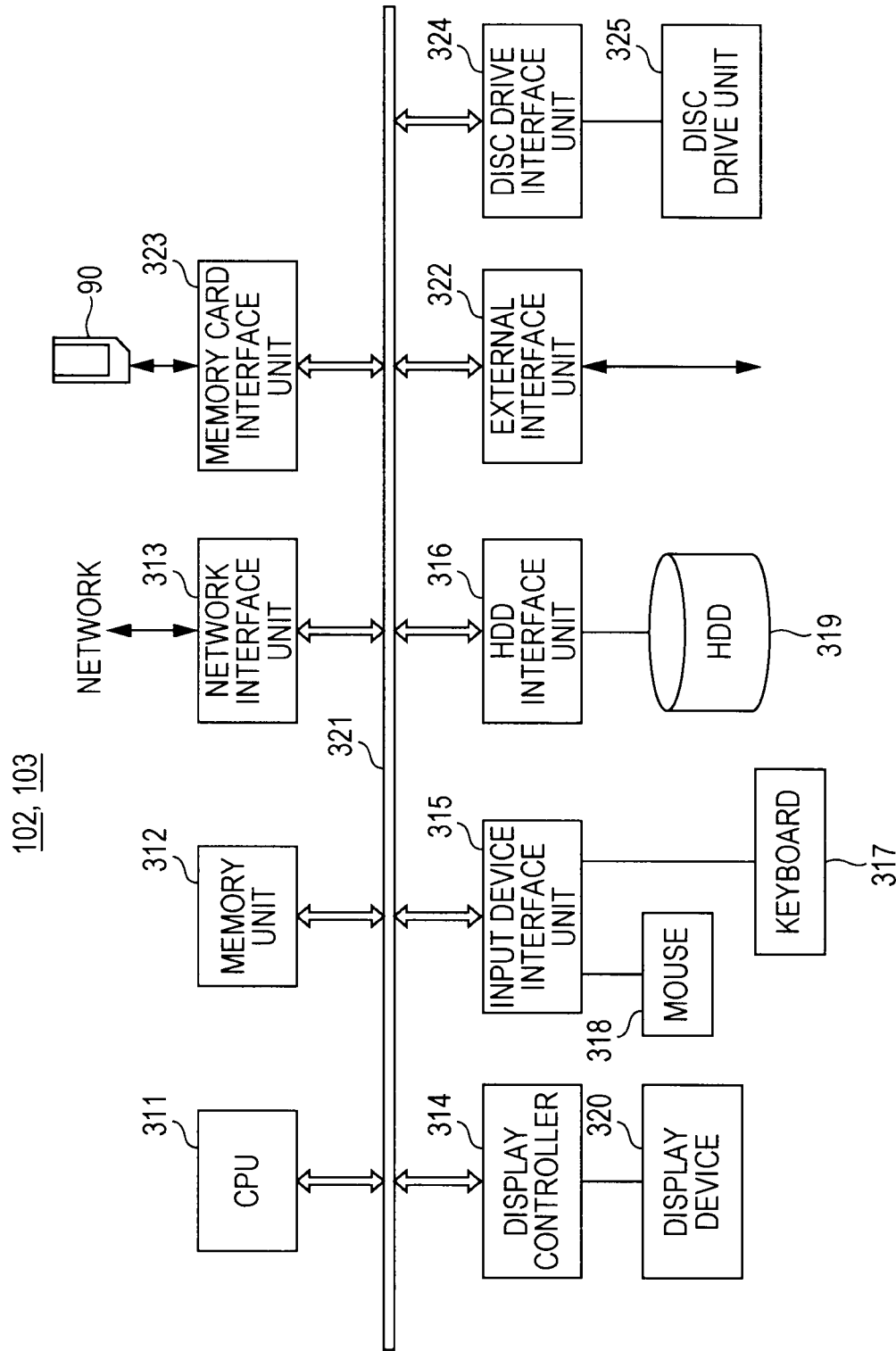
FIG. 4 is a block diagram of an information processing device equivalent to the display control device according to an embodiment.

Next, a configuration example of an information processing device as an embodiment will be described with reference to FIG. 4. This information processing device corresponds to the personal computer 102 or game machine 103 illustrated in FIGS. 1D and 1E, for example. FIG. 4 illustrates the configuration of the information processing device serving as the personal computer 102 or game machine 103.

The information processing device includes, as shown in the drawing, a CPU 311, a memory unit 312, a network interface unit 313, a display controller 314, an input device interface unit 315, an HDD interface unit 316, and a disc drive interface unit 324. Also, the information processing device includes a keyboard 317, a mouse 318, an HDD 319, a display device 320, a bus 321, an external device interface unit 322, a memory card interface unit 323, a disc drive unit 325, and so forth.

The CPU 311 which is the main controller of the information processing device executes various types of control processing according to a program stored in the memory unit 312. The CPU 311 is mutually connected to the other respective units by the bus 321.

A unique memory address or I/O address is given to each device on the bus 321, and the CPU 311 can perform device access by these addresses. An example of the bus 321 is a PCI (Peripheral Component Interconnect) bus.

The memory unit 312 is illustrated assuming that both volatile memory and nonvolatile memory are included. For example, the memory unit 312 includes nonvolatile memory, such as ROM (Read Only Memory) in with a program is stored, RAM for a computation work region or various types of temporal storage, EEP-ROM (Electrically Erasable and Programmable Read Only Memory), or the like. This memory unit 312 is used for storing program codes to be executed at the CPU 311, identification information peculiar to the information processing device, and other information, or used for the buffer region of communication data, or the work area of work data under execution.

The network interface unit 313 connects the information processing device to a network such as the Internet, a LAN (Local Area Network), or the like in accordance with a predetermined communication protocol such as Ethernet (registered trademark) or the like. The CPU 311 may perform communication with each device connected to the network via the network interface unit 313.

The display controller 314 is a dedicated controller for actually processing a drawing command that the CPU 311 issues, and supports a bitmap drawing function equivalent to the SVGA (Super Video Graphic Array) or XGA (eXtended Graphics Array), for example. The drawing data processed at the display controller 314 is temporarily written in a frame buffer (not shown) for example, and then output to the screen of the display device 320. The display device 320 is formed of, for example, an organic EL display, a CRT (Cathode Ray Tube) display, or a liquid crystal display, or the like.

The input device interface unit 315 is a device for connecting a user input device such as the keyboard 317, mouse 318, or the like to the computer system serving as the information processing device. Specifically, the operation input of the user as to the information processing device is performed using the keyboard 317 and mouse 318, and operation input information thereof is supplied to the CPU 311 via the input device interface unit 315.

The HDD interface unit 316 performs interface processing of writing/readout as to the hard disk drive (HDD) 319. The HDD 319 is a commonplace external storage device on which a magnetic disk serving as a storage support is fixedly mounted, and excels in storage capacity, a data transfer rate, and so forth as compared to other external storage devices. Various types of software programs installed into the information processing device are stored in the HDD 319 in an executable state. Usually, the program codes of an operating system that the CPU 311 has to execute, application programs, device drivers, and so forth are stored in the HDD 319 in a nonvolatile manner.

The various types of programs stored in the HDD 319 are loaded to the memory unit 312 at the time of activation of the information processing device, at the time of activation of an application program according to the user layer, or the like. The CPU 311 performs processing based on the program loaded to the memory unit 312.

The external device interface unit 322 is an interface with an external device connected, for example, by the USB standard or the like. For example, the imaging apparatus 100 or the like is assumed as an external device. The information processing device may perform capturing of the image data PCT and additional information CI from the imaging apparatus 100 and so forth by communication via this external device interface unit 322. Note that the external device interface unit 322 is not restricted to the USB standard, and may be another interface standard, for example, such as IEEE1394 or the like.

The memory card interface unit 323 performs writing/readout of data as to the memory card 90. For example, the memory card 90 used at the above-described imaging apparatus 100 is mounted, whereby the image data PCT and additional information CI can be read in from the memory card 90 thereof.

The disc drive interface unit 324 performs interface processing of writing/readout as to the disc drive unit 325. With the disc drive unit 325, recording/playback as to various types of optical disc such as the CD system, DVD system, Blu-ray disc system, or the like is performed.

With such an information processing device, computation processing/control operation is performed based on the software structure in the CPU 311, i.e., software such as application programs, OS (Operating System), device drivers, and so forth, and accordingly, various types of operations are executed.

In this case, the HDD 319, memory card 90, or an optical disc mounted on the disc drive unit 325 serves as the image storage unit 10 in FIG. 2, the CPU 311 serves as the control unit 11 in FIG. 2, and the display controller 314 serves as the display signal output unit 12 in FIG. 2, for example.

Image data recorded in the optical disc mounted on the disc drive unit 325, or image data recorded in the memory card 90 or HDD 319 is read out, and transferred to the display controller 314, whereby the image data can be displayed on the display device 320. In this case, automatic scroll display according to the present example may be executed under the control of the CPU 311. An example of this is display operations described in FIGS. 10 and 1E.

4. Outline of Panoramic Image Data

Figure 5:
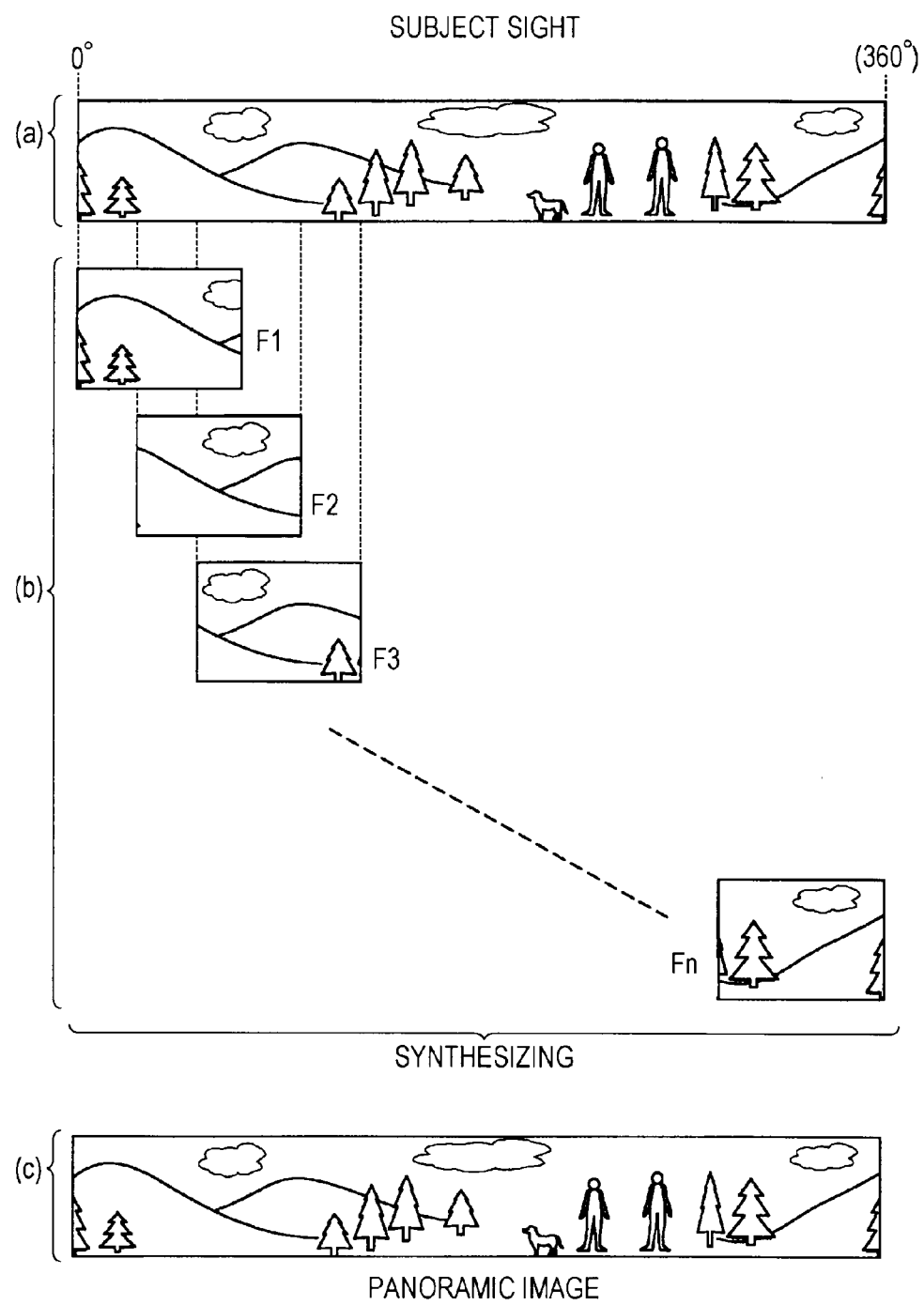
FIG. 5 is an explanatory diagram of a panoramic image.

The outline of panoramic imaging that can be performed at the imaging apparatus 100 will be described with reference to FIG. 5. For example, let us say that (a) in FIG. 5 is a scene with circumference of 360 degrees with the position of the imaging apparatus 100 as the center. Panoramic imaging is operations for obtaining such a circumferential scene with a wide range as one image.

The processing of the imaging apparatus 100 is as follows. For example, the imaging apparatus 100 is mounted on a camera platform which can rotate in the panning direction, the subject direction (imaging visual field) of a digital still camera 1 is horizontally moved. Alternatively, the user holds the imaging apparatus 100 by hands, and moves the subject direction.

At this process, the imaging apparatus 100 captures frame image data to be imaged for each predetermined frame interval as illustrated in frames F1, F2, F3, . . . , Fn in (b) in FIG. 5, for example.

Synthesizing processing is then performed using a region for each piece of the frame image data F1 through Fn. Though details regarding the details of the synthesizing processing will be avoided here, this processing is consequently processing for combining images imaged as a plurality of frame image data. For example, panoramic image data such as (c) in FIG. 5 is generated, and this is recorded in the memory card 90 as one panoramic image data. For example, if the imaging apparatus 100 is rotated 360 degrees, the scenes of all of the circumferences with the position of the imaging apparatus 100 as the center are obtained as one panoramic image.

Note that the horizontal angle range at the time of panoramic imaging may be restricted to 270 degrees, 215 degrees, or the like for example, instead of 360 degrees. Further, the panoramic direction is not restricted to the horizontal direction, and the subject direction may be moved in the vertical direction, or may be moved in the oblique direction.

5. Automatic Scroll Processing I According to First Embodiment

Hereafter, automatic scroll processing as a display control device according to an embodiment will be described. The display control device means the imaging apparatus 100, personal computer 102, game machine 103, and so forth, which has the configuration in FIG. 2 (particularly, configuration equivalent to the control unit 11 and display signal output unit 12). Hereafter, an automatic scroll processing example will be described with reference to the configuration in FIG. 2.

Figure 6:
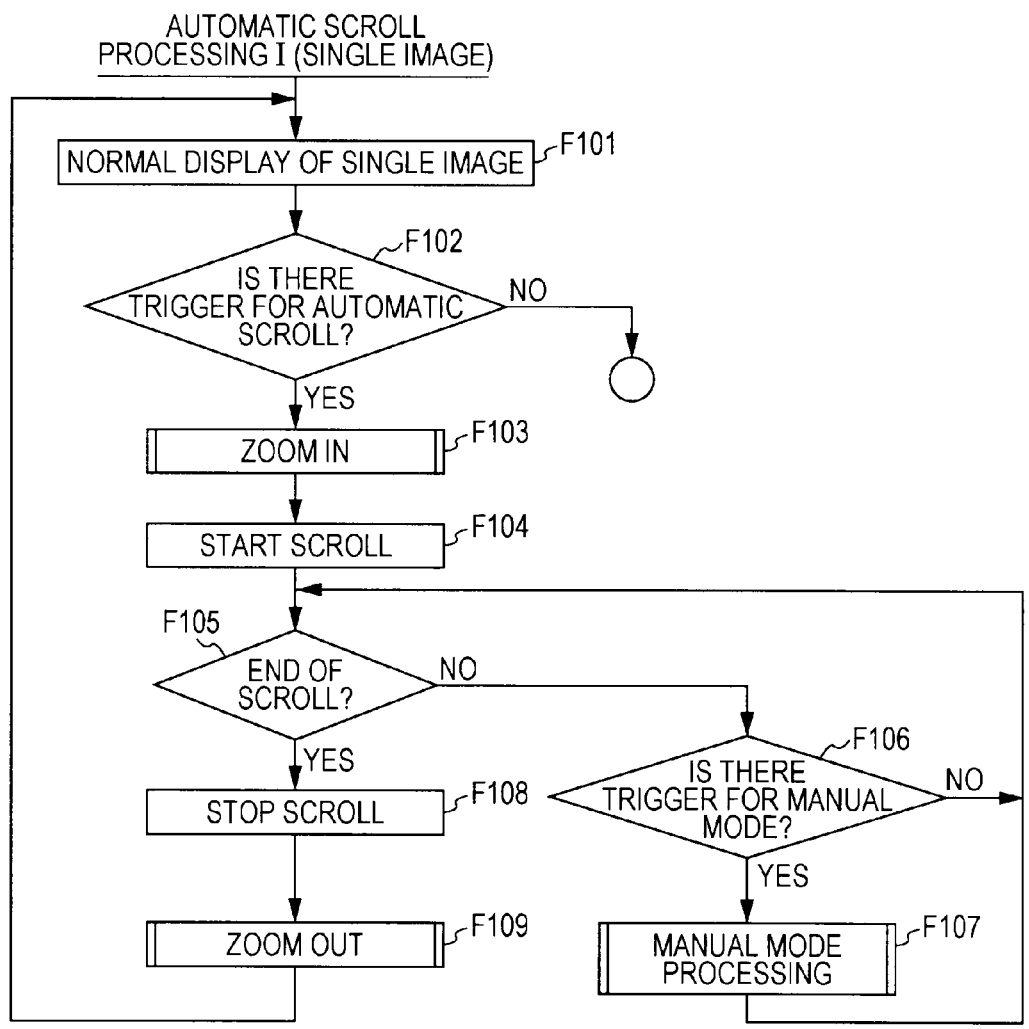
FIG. 6 is a flowchart of automatic scroll processing I according to an embodiment.

FIG. 6 illustrates automatic scroll processing I as a first embodiment. Note that automatic scroll processing I through VI that will be described as embodiments will be described as control processing as to the display signal output unit 12 by the control unit 11.

The automatic scroll processing I shown in FIG. 6 is processing for executing display in the sequence of normal display→zoom-in display→scroll display→zoom-out display→normal display at the time of displaying one image (single image) as still image data, and specifically as panoramic image data.

Figure 7A:
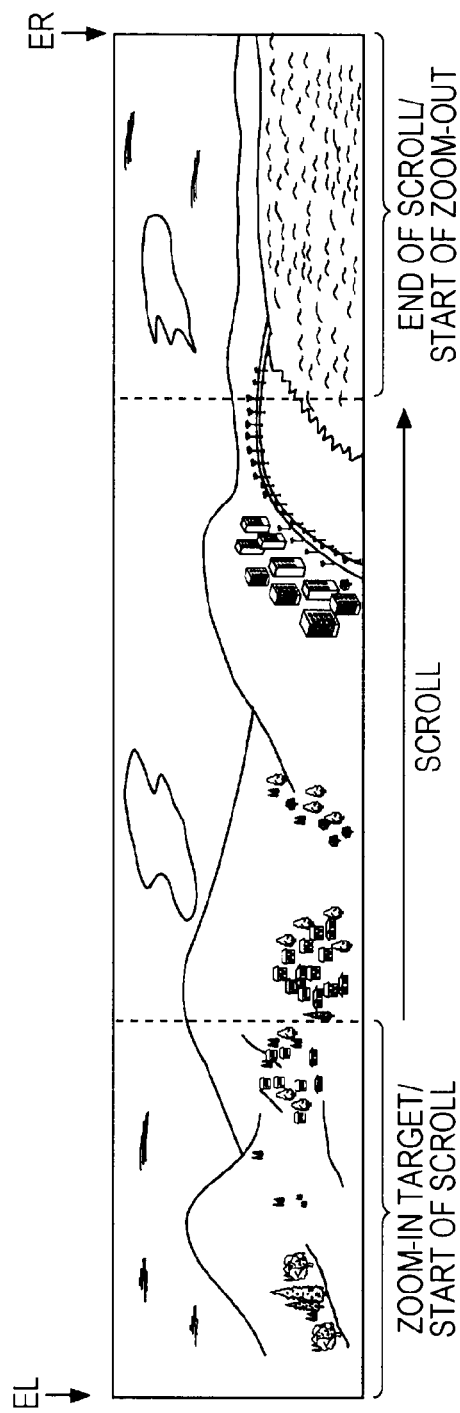
FIGS. 7A and 7B are explanatory diagrams of a panoramic image which is data to be displayed according to an embodiment.

FIG. 7A illustrates an example of panoramic image data. Description will be made regarding operation in the event that the user has selected and displayed image data as a landscape panoramic image such as FIG. 7A as image data stored in the image storage unit 10, as an example.

In the event of performing display of this panoramic image data, the control unit 11 first executes normal display as step F101 in FIG. 6. Specifically, the control unit 11 reads out this still image data from the image storage unit 10, transfers to the display signal output unit 12, and then instructs normal display.

The normal display is taken here as to display the whole of one still image. However, with the present disclosure, the normal display is not restricted to the whole display in all cases. For example, in the event of image display whereby generally the entirety of a panoramic image can be recognized, there may be a portion somewhat not displayed.

Figure 8A:
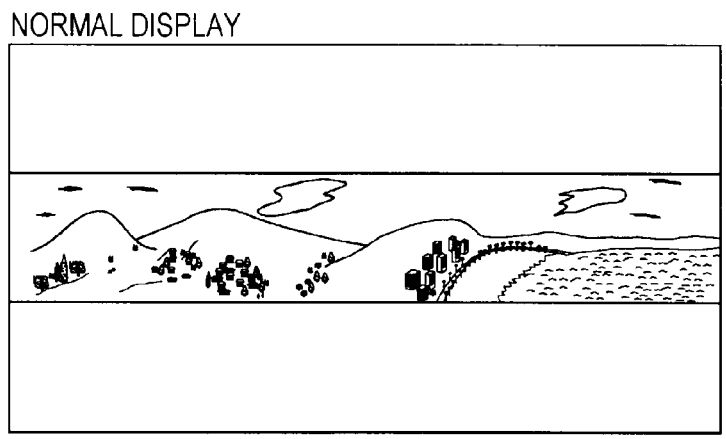
FIGS. 8A through 8C are explanatory diagrams of display state transition in the automatic scroll processing according to an embodiment.

FIG. 8A illustrates a state in which the normal display (whole display) of the image data in FIG. 7A is performed on the screen such as the display unit 13 or the like. In the event of this panoramic image data, the transverse size is markedly longer than the longitudinal size. In the event that the normal display is performed regarding such panoramic image data, reduced display is performed such as FIG. 8A so as to display the whole image on the screen. That is to say, the transverse size of the panoramic image data is arranged so as to be included in the screen.

In response to the normal display being instructed as to transferred image data, the display signal output unit 12 performs reduction processing or the like as appropriate, and outputs display image signals for performing display in FIG. 8A to the display unit 13 or the like.

In step F102, the control unit 11 monitors occurrence of a trigger of automatic scroll display. The trigger mentioned here may be a trigger by the user's operations, or may be a trigger that the control unit 11 automatically generates.

For example, in a state in which one image is displayed, in the event of starting the automatic scroll processing according to the user performing an operation for requesting automatic scroll display, the user's predetermined operation becomes a trigger.

Also, for example, it can also be conceived that in a state in which one image is displayed, automatic scroll display is started in the event of predetermined time having elapsed without other operations being performed by the user. In this case, it may be determined as a trigger of step F102 that the control unit 11 performs counting of time after display starts, and predetermined time has elapsed without any operation.

Also, an example can be conceived wherein whenever the aspect ratio of image data is equal to or greater than a predetermined ratio, automatic scroll display is performed. In this case, the control unit 11 has to take a result determined to be a panoramic image as a trigger.

If there is a trigger for executing automatic scroll display, in step F103 the control unit 11 instructs the display signal output unit 12 to perform zoom-in display. For example, a portion on the image left edge EL side illustrated in FIG. 7A is instructed as a zoom-in target, thereby executing zoom-in display.

Figure 8B:
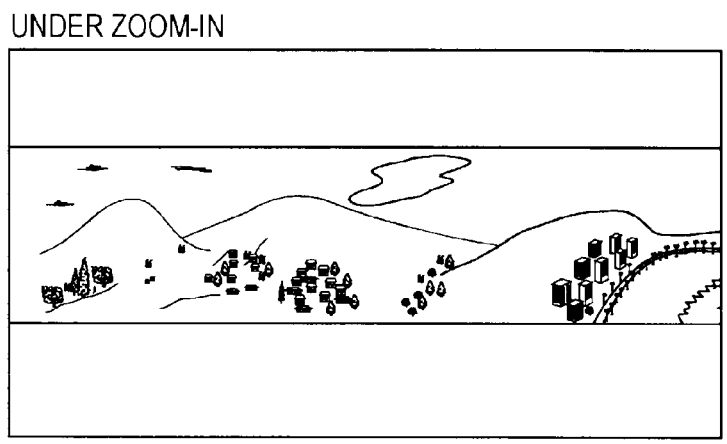
Figure 8C:
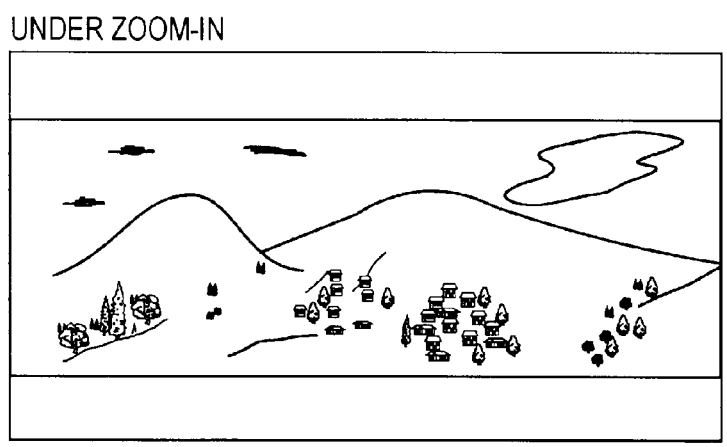
Figure 9A:
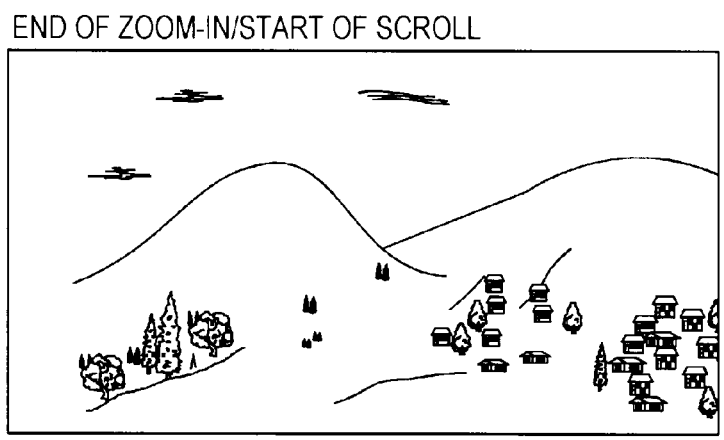
FIGS. 9A through 9C are explanatory diagrams of display state transition in the automatic scroll processing according to an embodiment.

The transition of a display state by zoom-in is shown as FIG. 8A→FIG. 8B→FIG. 8C→FIG. 9A. Specifically, from the normal display state, a trimming range of an image is gradually narrowed down and also enlarged, such as FIG. 8B and FIG. 8C by leaving an image left edge portion. As shown in FIG. 9A, zoom-in is completed in a state in which the image region of the zoom-in target in FIG. 7A is fully displayed on the screen.

Note that the control unit 11 can recognize whether or not the display state has reached a zoom-in completion position by confirming the range of the display image signals that the display signal output unit 12 outputs, i.e., a pixel range trimmed for display from the entire image data (or the control unit 11 typically instructs a pixel range). This may also be applied to recognition regarding whether or not the display state has reached a later-described scroll end position, or has returned to the normal display state at the time of zoom-out. Control for such zoom-in display performed in step F103 is shown in FIG. 12A.

In step F150, the control unit 11 instructs the display signal output unit 12 a zoom-in target area. For example, the control unit 11 instructs a left edge portion of the panoramic image shown in FIG. 7A.

In step F151, the control unit 11 instructs the display signal output unit 12 reduction of a trimmed range while stepwisely changing the zoom scale and moving the midpoint of a display image, and in step F152 also confirms whether or not the display state has reached the display state of the zoom-in target area. In response to the instructions in step F151, the display signal output unit 12 gradually performs image trimming and enlargement the display state has reached the display state of the zoom-in target area in FIG. 9A through the display state s of zoom-in processes such as FIGS. 8B and 8C. Upon reaching this state, the control unit 11 proceeds from step F152 to F153, ends the zoom-in processing as zoom-in completion, and ends the processing in step F103 in FIG. 6.

Upon zoom-in being completed, subsequently in step F104 the control unit 11 starts scroll display. This scroll display is executed with the zoom-in completion position within an image as a scroll start position. For example, like FIG. 7A, the control unit 11 instructs the display signal output unit 12 so that an image left edge EL portion is taken as a scroll start position, scroll in the right direction up to the image right edge ER is performed on the display screen.

In response to this, the display signal output unit 12 generates display image signals while gradually shifting the trimming range of image data to the right side, and outputs to the display unit 13 and others.

Figure 9B:
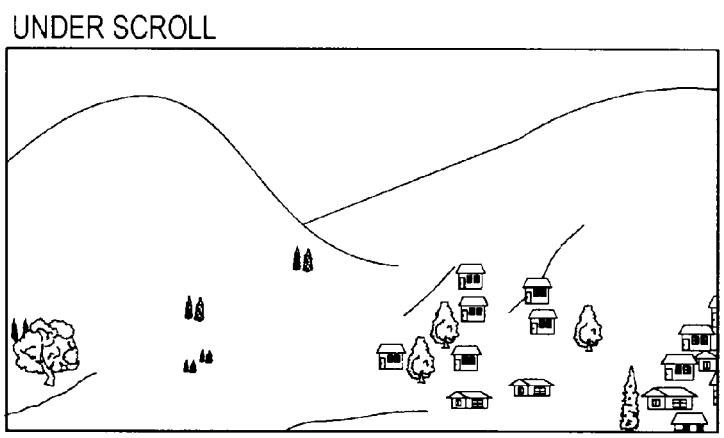
Figure 9C:
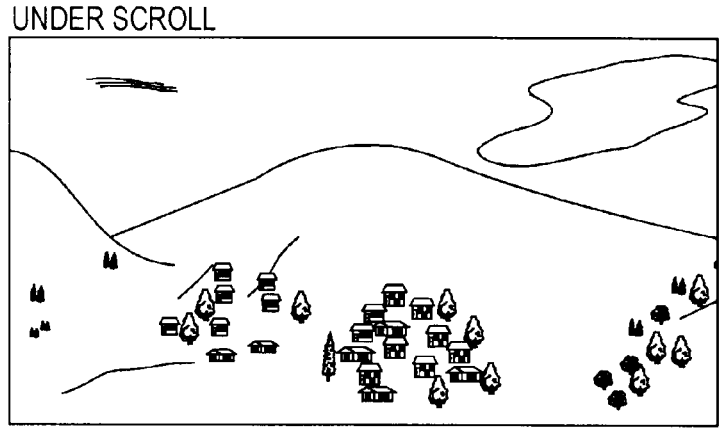
Figure 10A:
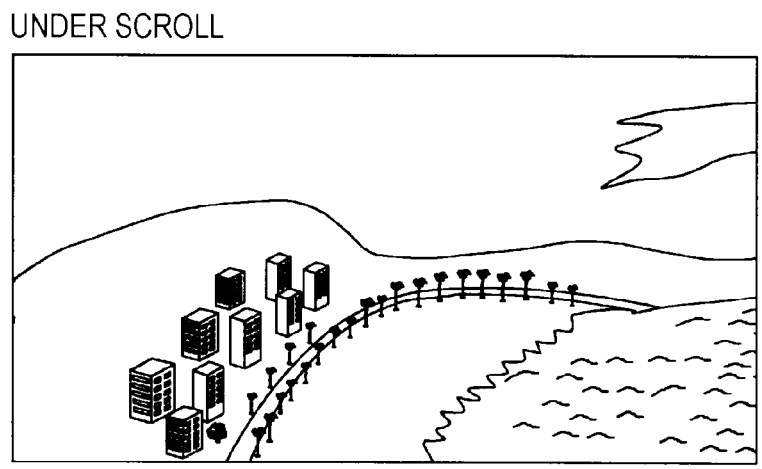
FIGS. 10A through 10O are explanatory diagrams of display state transition in the automatic scroll processing according to an embodiment.
Figure 10B:
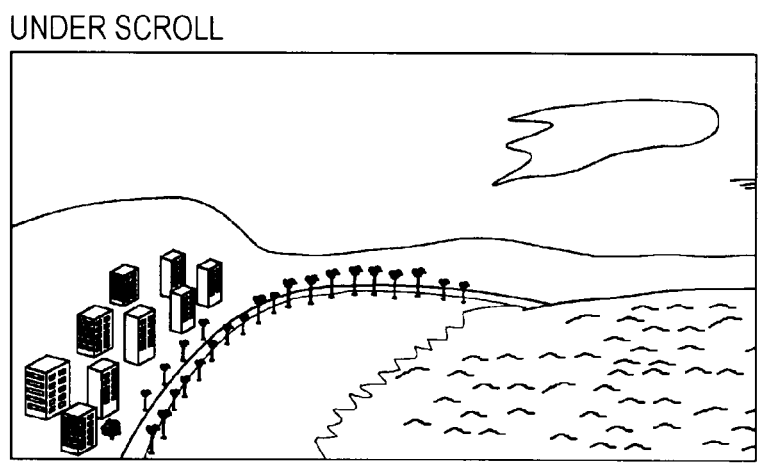
Figure 10C:
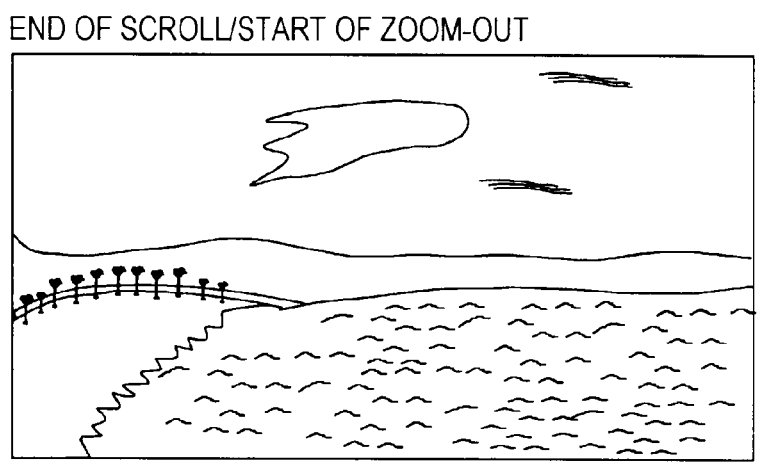

For example, the display image is scrolled such as FIG. 9A→FIG. 9B→FIG. 9C→FIG. 10A→FIG. 10B→FIG. 10C.

In step F105, the control unit 11 monitors end of scrolling under execution of scrolling, and also in step F106 monitors a trigger in a manual mode.

The manual mode is a mode wherein scrolling is interrupted in response to manual operations such as the user's panning, tilting, zooming, or the like during scroll, and image display according to the user's operations is performed. In the event of detecting the user's operations serving as a trigger of this manual mode, the control unit 11 proceeds to step F107, and performs processing in the manual mode. This will be described later.

For example, as shown in FIG. 10C, upon the screen display being scrolled up to the right edge ER of the panoramic image data, the control unit 11 determines to be scroll end. In this case, the control unit 11 proceeds to step F108, and instructs the display signal output unit 12 stop of scrolling.

In step F109, the control unit 11 executes zoom-out display. In this case, the control unit 11 executes zoom-out display from the scroll end position to the normal display.

Transition of a display state by zoom-out is shown as FIG. 10C→FIG. 11A→FIG. 11B→FIG. 11C. Specifically, the trimming range of the image is gradually widened and also reduced from an image right edge portion toward the entire display such as FIGS. 11A and 11B. Upon returning to the entire display of the panoramic image as the normal display like FIG. 11C, this is taken as completion of zoom-out.

Control for zoom-out display performed in step F109 will be shown in FIG. 12B.

In step F160, the control unit 11 instructs the display signal output unit 12 enlargement of the trimming range while stepwisely changing the zoom scale and moving the midpoint of the display image from the display state of the scroll end position. Upon the display returning to the normal display such as FIG. 11C, the control unit 11 proceeds from step F161 to step F162, and this is taken as completion of zoom-out. Thus, the processing in step F109 in FIG. 6 is completed, and the control unit 11 returns to step F101.

As described above, with the present example, in the event of displaying one still image data (e.g., panoramic image data), first the normal display is performed, and then automatic scroll display is executed according to the user's operations or automatically.

According to this automatic scroll display, display suitable for the user can be provided with the display of still image data which is a panoramic image, for example.

First, the entirety of the panoramic image is displayed before zoom-in and after zoom-out, whereby the user can recognize the entire image.

Moving to the scroll start position by zoom-in facilitates the user to recognize which portion of the entire image the scroll start position is. Performing scrolling can provide each portion to the user in detail. Also, performing zoom-out from the scroll end position to the normal display can tell the user completion of scrolling.

Further, connecting between the normal display and scroll display by zoom-in and zoom-out smoothly changes a series of display, providing an amusing and good-looking appearance. Also, such a series of display are automatically performed, and accordingly, operation burden is not placed on the user.

Note that, though not shown in the flowchart in FIG. 6, in the event that the user has performed an operation for ending automatic scroll display during automatic scroll display, automatic scroll display has to be finished at this time, and immediately switched to the normal display, for example.

Alternatively, in the event that image feeding operations have been performed during automatic scroll display, automatic scroll display has immediately to be finished, and switched to the normal display of the next image. This may also be applied to later-described automatic scroll processing II through VI.

6. Manual Mode Processing

Description has been made wherein the processing in the manual mode is performed as steps F106 and F107 in FIG. 6. When detecting operation input for instructing change of the display position while executing scroll display, the control unit 11 interrupts scroll display, and instructs the display signal output unit 12 output of display image signals for performing display according to the operation input as the manual mode. Further, the control unit 11 instructs the display signal output unit 12 so as to resume scroll display according to end of the manual mode.

As described above, upon detecting operation input for instructing change of the display position such as the user's panning operation, tilting operation, zooming operation, and so forth during scroll, the control unit 11 advances the processing in FIG. 6 from step F106 to step F107.

A manual mode processing example of this step F107 will be shown in FIG. 13A. First, in step F171, the control unit 11 instructs the display signal output unit 12 interruption of scrolling display.

Then, in step F172, the control unit 11 instructs the display signal output unit 12 so as to pan, tilt, or zoom-in/zoom-out the display image according to the detected operation input. Specifically, the control unit 11 changes the trimming position or scale of the display image according to the user's operations.

An example of this will be shown in FIG. 14. For example, let us say that at the time of the display state in (a) in FIG. 14 during scroll process, the user has performed panning, tilting, or zooming operation so as to enlarge a portion surrounded by a dashed line. At this time, the control unit 11 changes the trimming position or zoom scale according to the user's operations, and executes image display as shown in (b) in FIG. 14.

Specifically, in step F172, the control unit 11 instructs change of display according to the user's operations, whereby the user can arbitrarily zoom an image portion in interest or the like, or move the display position (panning movement, tilting movement) during scrolling.

In step F173, the control unit 11 determines resumption of the automatic scroll processing due to completion of the manual mode. For example, the control unit 11 detects that the user has performed the end operation of the manual mode processing. Alternatively, in the event that the user's operations have not been detected for a given length of time, this may be determined to be completion of the manual mode processing.

In the event of resuming the automatic scroll processing, the control unit 11 performs panning/tilting/zoom-in or zoom-out from the image display state at this point with the resumed position of automatic scroll as a target. In particular, in the event that the zoom scale has not been changed since interruption of scrolling, the display position has to return to the resumed position by gradually changing the display position as panning or tilting, and in the event that the zoom scale has been changed since interruption of scrolling, zoom-in or zoom-out has to be performed.

The resumed position has to be a scroll interrupted position immediately before starting the manual mode processing, for example. For example, in the event that completion of the manual mode processing has been determined in the display state in (b) in FIG. 14, the control unit 12 instructs the display signal output unit 12 to return to the display state in (a) in FIG. 14.

Then, in step F175, the control unit 11 resumes automatic scrolling, ends the processing in step F107 in FIG. 6, and returns to a monitoring loop in steps F105 and F106.

Manual operations are reflected as the manual mode processing in this way, and accordingly, this is useful in the event that the user has found out a portion of interest during automatic scroll display, or wants to review a portion once passed through by scrolling, or the like. Also, in the event of resuming the automatic scroll processing, the display image is smoothly moved to the resumed position, and looks good when viewing.

Incidentally, with the processing example in FIG. 13A, according to completion of the manual mode processing, returning to the scroll resumed position is gradually performed from the image position where the user arbitrarily moves as zoom-in or zoom-out, or panning and tilting, but in this case, switching of the screen may immediately be performed without gradually being returned.

FIG. 13B illustrates a processing example. However, steps F171, F172, F173, and F175 in FIG. 13B are the same as with FIG. 13A, and FIG. 13B differs from FIG. 13A only in that switching of display to the resumed position is performed as step F180. For example, in step F180, the control unit 11 instantaneously switches from the display state such as in (b) in FIG. 14 to the display state in (a) in FIG. 14 without zooming, panning, or tilting. The control unit 11 then resumes automatic scroll from the position thereof.

According to instantaneously switching the display state in this way, an advantage is obtained wherein the user can readily understand that the manual mode processing has been completed, and the automatic scroll processing has been resumed.

Note that at the time of ending the manual mode processing and resuming the automatic scroll processing, the control unit 11 does not return to the scroll position immediately before start of the manual mode processing (i.e., scroll interrupted position) in all cases. As for the resumed position, for example, the control unit 11 may return to the start position of the automatic scroll processing (e.g., left edge position in FIG. 7A). In this case, the user can view the whole scroll again.

Also, the resumed position may be an image position where the user moves in the manual mode. Thus, the user can view scroll display from the position of interest or an arbitrarily moved position. This case is convenient when review scroll from a certain position is desired.

Also, the resumed position may be the original scroll end position (e.g., right edge position in FIG. 7A) or the like. In this case, it can be conceived to scroll in the opposite direction as to scroll before interruption.

Also, the resumed position may be a position where a particular subject image exists such as a person's face image or the like. In the event that the control unit 11 has recognized a face image by image analysis, a position within an image in which the face image thereof exists is taken as the scroll resumed position. Also, these resumed positions may be used as appropriate according to situations.

For example, the resumed position is set depending on whether the duration in the manual mode is equal to or greater than a predetermined period. In the event the duration in the manual mode is long, this is assumed as a case where the user has performed various operations to variously change the image range to be displayed. In the event that the user has changed the display position in the manual mode for a certain level of long period, it can be conceived that the scroll interrupted position does not have much meaning.

Therefore, in the event that the manual mode has ended with a predetermined period, the scroll interrupted position is taken as the resumed position, and in the event that the manual mode has ended after elapse equal to or greater than a predetermined period, the start position of the automatic scroll processing (e.g., left edge position in FIG. 7A) may be taken as the resumed position.

Also, with the same concept, the resumed position may be changed depending on whether or not the movement amount of the display screen by the manual mode is equal to or greater than a predetermined value. Specifically, for example, in the event that the user has greatly changed the display position within the image data in the manual mode, the start position of the automatic scroll processing (e.g., left edge position in FIG. 7A) is taken as the resumed position, and in the event that the display position at the time of completion of the manual mode is close to the scroll interrupted position, the scroll interrupted position is taken as the resumed position.

7. Scroll Start and End Position Examples

Next, variations of the scroll start position and end position in the automatic scroll processing will be described. The scroll start position in this case means the image region of a zoom-in target, and the scroll end position means an image region when starting zoom-out. Specifically, the scroll start position means an image region serving as a zoom-in target in step F150 in FIG. 12A. Also, the scroll end position means an image region where end of scrolling is determined in step F105 in FIG. 6, and is changed to zoom-out.

Figure 15A:
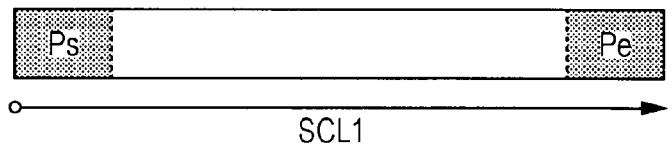
FIGS. 15A through 15G are explanatory diagrams of scroll start and end positions according to an embodiment.

FIGS. 15A through 15G schematically illustrate landscape panoramic image data. FIG. 15A is an example wherein a scroll start position Ps is taken as a left edge portion of image data, a scroll end position Pe is taken as a right edge portion of the image data, and automatic scroll SCL1 from the left edge to the right edge is performed. Specifically, this example is equivalent to the examples described in FIGS. 7A and 8 through 11.

Figure 15B:
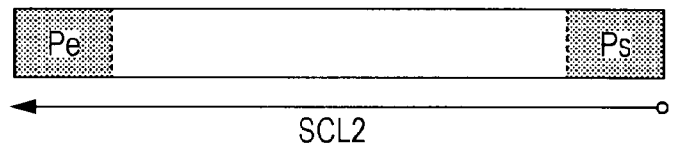

Conversely, FIG. 15B is an example wherein the scroll start position Ps is taken as a right edge portion of image data, the scroll end position Pe is taken as a left edge portion of the image data, and automatic scroll SCL2 from the right edge to the left edge is performed.

Figure 15C:
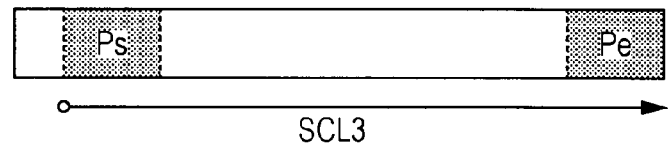

FIG. 15C is an example wherein the scroll start position Ps is taken as a non-edge portion of image data, the scroll end position Pe is taken as a right edge portion of the image data, and automatic scroll SCL3 in the right direction is performed.

Figure 15D:
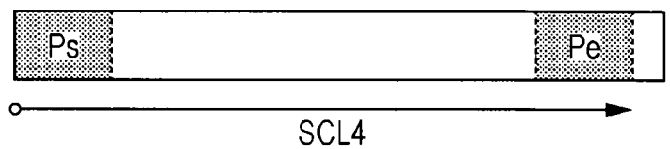

FIG. 15D is an example wherein the scroll start position Ps is taken as a left edge portion of image data, the scroll end position Pe is taken as a non-edge portion of the image data, and automatic scroll SCL4 in the right direction is performed.

Figure 15E:
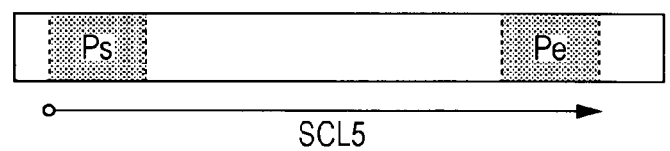

FIG. 15E is an example wherein the scroll start position Ps is taken as a non-edge portion of image data, the scroll end position Pe is also taken as a non-edge portion of the image data, and automatic scroll SCL5 in the right direction is performed.

With each of these FIGS. 15C, 15D, and 15E, an example can also be conceived wherein the scroll start position Ps and the scroll end position Pe are switched, and automatic scroll in the left direction is performed.

Figure 15F:
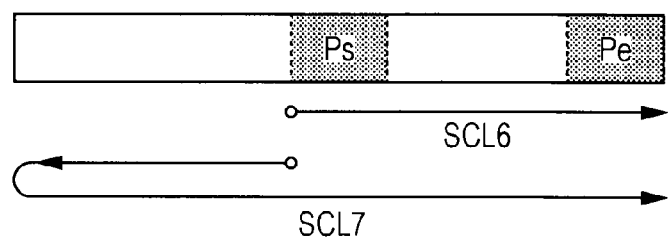

FIG. 15F is an example wherein the scroll start position Ps is taken as a non-edge portion and is at the approximate middle portion (or arbitrary portion), and the scroll end position Pe is taken as a right edge portion.

As for scroll operations, as with scroll SCL6, it can be conceived to perform from the scroll start position Ps to the scroll start position Ps.

Also, as with scroll SCL7, it can also be conceived to perform scrolling from the scroll start position Ps toward a left edge portion, and then fold back scroll so as to direct to the scroll end position Pe.

In this case as well, an example can also be conceived wherein the scroll start position Ps and the scroll end position Pe are switched, and scroll SCL6 and SCL7 are performed in the opposite direction of the drawing.

Figure 15G:
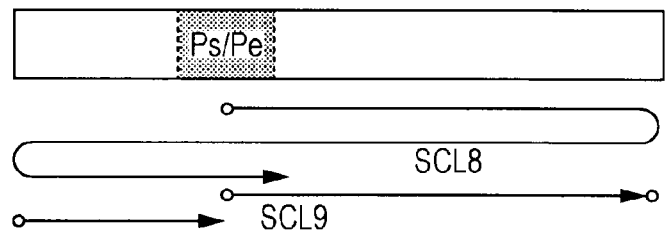

FIG. 15G is an example wherein the scroll start position Ps and the scroll end position Pe match, and both are taken as non-edge portions.

As for scroll operations, like scroll SCL8, for example, an operation can be conceived to direct from the scroll start position Ps toward a right edge portion, and then fold back toward a left edge portion, and further fold back and reach toward the scroll end position Pe (or inverse operation thereof).

Alternatively, such as shown as scroll SCL9, for example, an operation can be conceived to direct from the scroll start position Ps toward a right edge portion, and reach from a left edge portion to the scroll end position Pe (or inverse operation thereof).

Settings of the scroll start position Ps and the scroll end position Pe can variously be conceived other than the examples shown in FIGS. 15A through 15G.

Also, landscape panoramic image data has been described as examples here, but in the event of performing scroll in the vertical direction as to landscape panoramic image data as well, in the same way as with the examples in FIGS. 15A through 15G, various types can be conceived. The horizontal direction in each example in FIGS. 15A through 15G has to be considered as the vertical direction.

The scroll start position/end position that can variously be conceived, but how to set (select) these in the actual automatic scroll processing can also variously be conceived.

First, it may be conceived to fix one of those. For example, at the time of the automatic scroll processing, the scroll start position/end position are typically set, for example, such as FIG. 15A, and zoom-in/scroll/zoom-out is performed. Fixing the scroll start position/end position realizes reduction of burden of the automatic scroll processing of the control unit 11.

Also, in respect of fixing, an arrangement may be made wherein arbitrary scroll start position/end position are selected by the user from those shown in FIGS. 15A through 15G, and the automatic scroll processing is performed with the selected settings. The automatic scroll processing according to the user's preference is realized. In particular, in the event that the user considers that a right edge portion or a left edge portion of an image is unnecessary for display, this can be handled by selecting scroll start/end positions such as FIGS. 15C, 15D, and 15E.

An arrangement may be made wherein each time the control unit 11 performs the automatic scroll processing, the control unit 11 selects one pattern out of pattern of the scroll start/end positions shown in FIGS. 15A through 15G in a predetermined sequence or at random, and performs the automatic scroll processing with the settings of the selected scroll start/end positions. Thus, diversified automatic scroll display can be provided to the user.

Also, the control unit 11 may set the scroll start position/ end position according to the additional information CI of the image data PCT.

For example, the control unit 11 scans panoramic direction information at the time of imaging from the additional CI regarding the image data PCT of a panoramic image serving as a display object. In the event that the movement direction of the subject direction at the time of panoramic imaging is from the left to the right, the scroll start position/ end position in FIG. 15A are employed, and in the event that the movement direction of the subject direction at the time of panoramic imaging is from the right to the left, the scroll start position/end position in FIG. 15B are employed, for example. That is to say, scrolling is performed in a direction according to visual field movement at the time of panoramic imaging with the position of an edge portion serving as the imaging start side at the time of imaging being taken as the origin. It goes without saying that this can also be applied to the case of vertical scrolling.

As shown in FIGS. 15C, 15E, and 15F, examples which can be conceived of a case where the scroll start position Ps is taken as a non-edge portion include a position setting obtained by determining a particular object according to image analysis, a position setting according to distance of a subject, and a random position setting.

For example, the control unit 11 determines an image region where a particular subject exists such as a person's face or the like by image analysis. The control unit 11 then sets a pixel range including a face image thereof or the like as the scroll start position Ps. Thus, an operation can be realized wherein automatic scrolling is started by a person's face being zoomed in a certain position, for example.

Alternatively, there may be an example wherein a position where a person's face image exists is taken as the scroll end position Pe. Thus, an operation can be realized wherein, with automatic scroll display, upon a person's face appearing, scroll ends and zoom-out is performed.

Also, the control unit 11 determines distance of a subject within image data. The control unit 11 then takes a subject position determined to be the closest position as the scroll start position Ps, zooms therein, and starts scrolling. For example, this is effective in the event that image data is 3D photo image data. Specifically, in the event that the scroll end position Pe is a subject position determined to be the most distant position, scroll display such as directing from a close view to a distant view may be realized.

Also, let us say that the control unit 11 selects a non-edge position within the image data as the scroll start position Ps at random, or selects as the scroll end position Pe. Thus, diversified automatic scroll display can be provided to the user. It goes without saying that the scroll operation in this case may also be selected with the scroll SCL3 through SCL9 or the like in FIGS. 15A through 15G at random.

8. Automatic Scroll Processing II According to Second Embodiment

Automatic scroll processing II as a second embodiment will be described with reference to FIG. 16.

Figure 16:
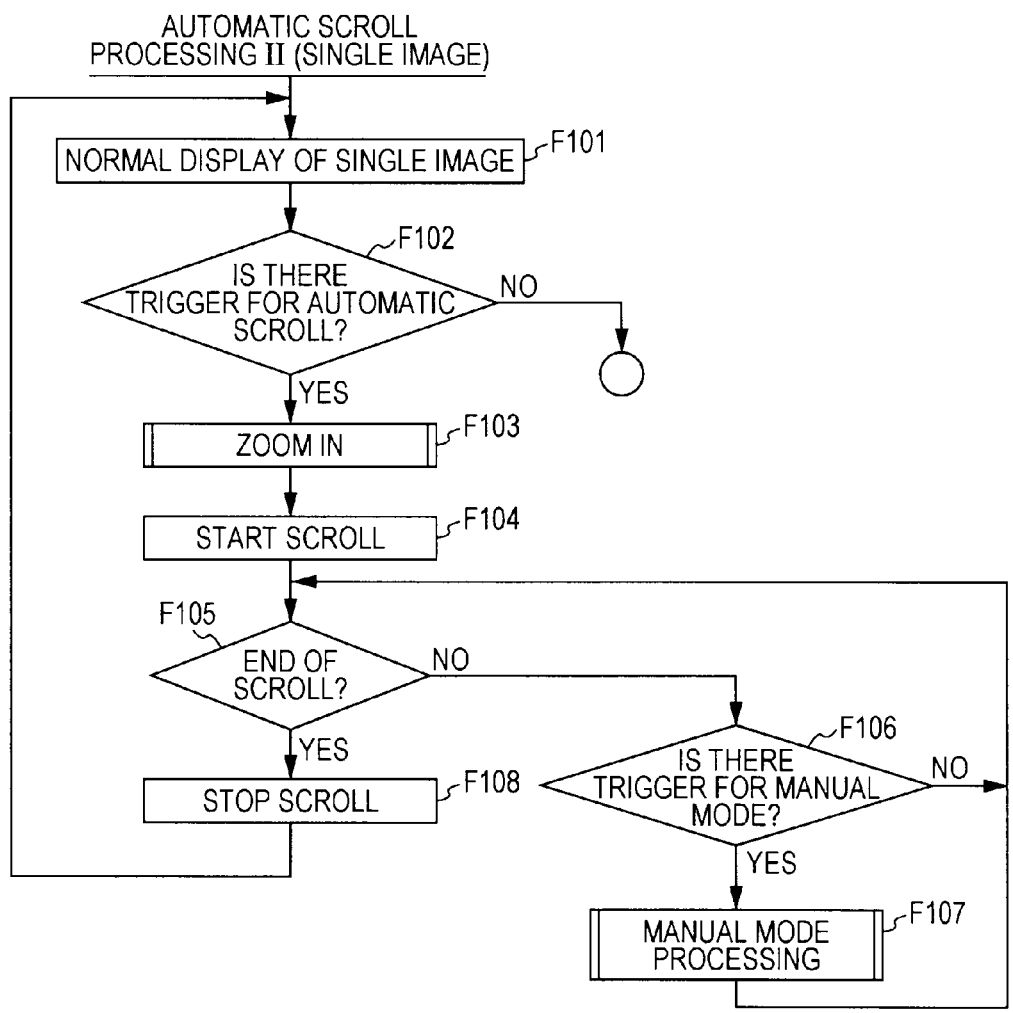
FIG. 16 is a flowchart of automatic scroll processing II according to an embodiment.

The automatic scroll processing II shown in FIG. 16 is processing for performing image display in the sequence of the normal display→zoom-in display→scroll display→normal display at the time of displaying a single image which is still image data, and particularly as panoramic image data.

Note that in FIG. 16, the same processing as with FIG. 6 is denoted with the same step number, and redundant description thereof will be avoided. The processing in steps F101 through F107 is the same as with FIG. 6.

With this automatic scroll processing II, in the event of having reached end of scrolling in step F105, the control unit 11 stops scroll in step F108, returns to step F101 without change, and returns to the normal display state. That is to say, the control unit 11 does not perform zoom-out after end of scrolling, and immediately returns to the normal display. For example, the control unit 11 switches the display immediately from the state in FIG. 10C to the state in FIG. 11C.

According to automatic scroll display of the present processing example, display suitable for the user can be provided with display of still image data which is a panoramic image, for example. In particular, this processing example is suitable for realizing a case where the user can readily understand end of scrolling by preventing zoom-out after end of scrolling.

9. Automatic Scroll Processing III According to Third Embodiment

Automatic scroll processing III as a third embodiment will be described with reference to FIG. 17.

Figure 17:
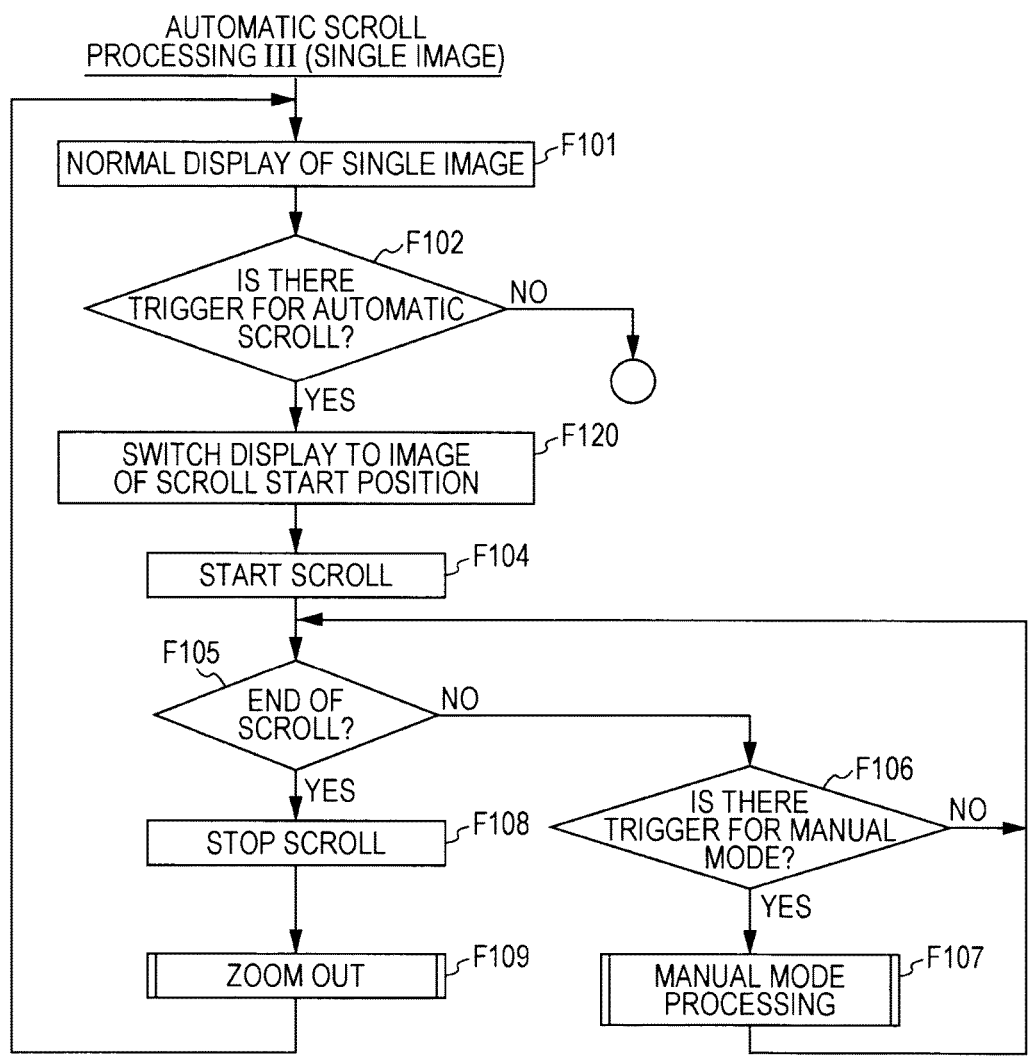
FIG. 17 is a flowchart of automatic scroll processing III according to an embodiment.

The automatic scroll processing III shown in FIG. 17 is processing for performing image display in the sequence of the normal display→scroll display→zoom-out display→normal display at the time of displaying a single image which is still image data, and particularly as panoramic image data.

Note that in FIG. 17, the same processing as with FIG. 6 is denoted with the same step number, and redundant description thereof will be avoided.

When executing the normal display of an image to be displayed in step F101, in the event of recognizing occurrence of a trigger for automatic scroll display in step F102, the control unit 11 proceeds to step F120. The control unit 11 then instructs the display signal output unit 12 switching of display to an image in the scroll start position. For example, the control unit 11 performs control for switching from the state in FIG. 8A to the state in FIG. 9A, i.e., does not perform zoom-in.

Then, in step F104, the control unit 11 starts scroll display. Steps F104 through F109 are the same as with FIG. 6.

According to this automatic scroll display as well, display suitable for the user can be provided with display of still image data which is a panoramic image, for example. In particular, this processing example is suitable for a case where it is prioritized that scrolling is immediately started by preventing zoom-in before start of scrolling.

10. Automatic Scroll Processing IV According to Fourth Embodiment

Fourth through sixth embodiments are automatic scroll processing in the event of performing slide show playback for automatically sequentially displaying a plurality of image data.

With slide show playback, for example, the user performs an operation for instructing slide show playback by specifying the folder of image data 10 stored in the image storage unit 10 in FIG. 2. The control unit 11 then performs processing for sequentially or randomly selecting image data included in this folder, and sequentially displaying the selected respective images.

The processing of the control unit 11 at the time of a slide show being started as automatic scroll processing IV according to the fourth embodiment will be described with reference to FIG. 18.

Figure 18:
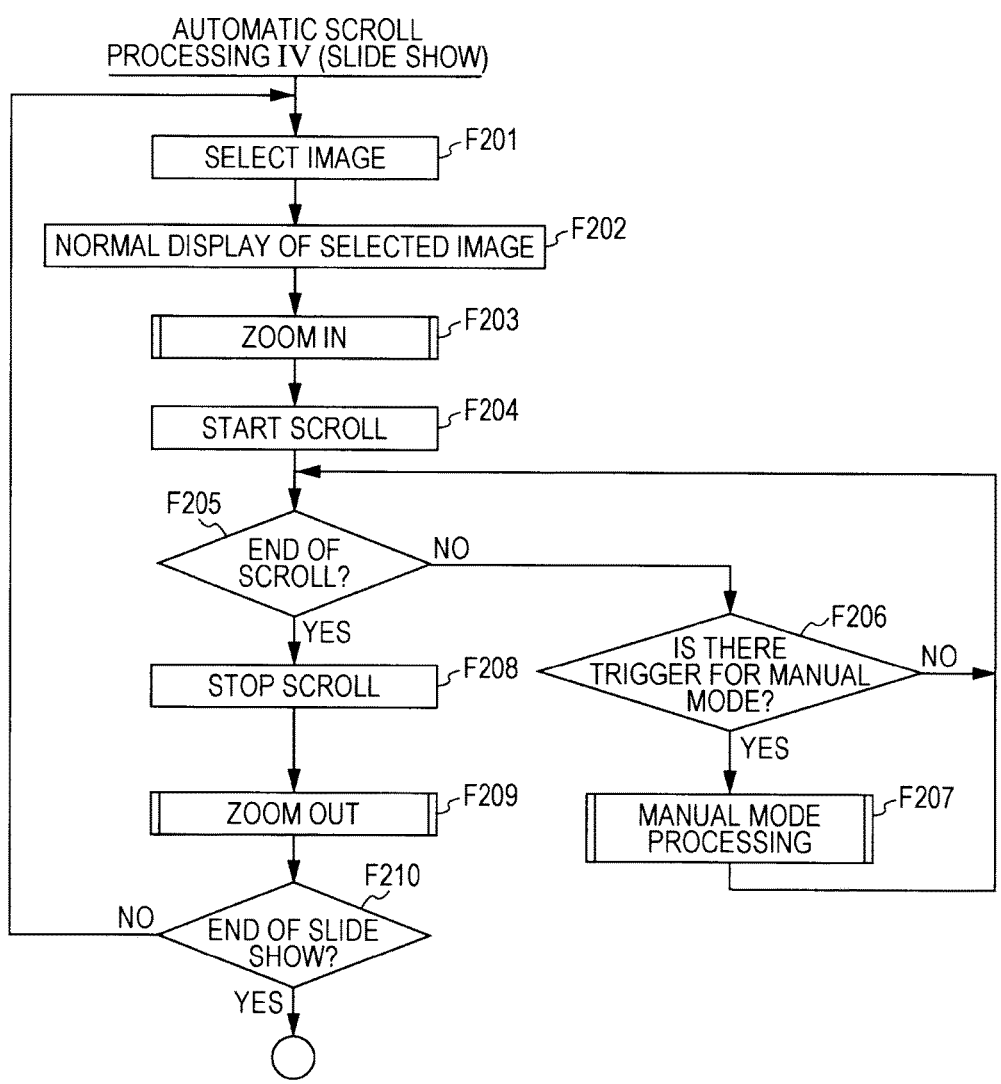
FIG. 18 is a flowchart of automatic scroll processing IV according to an embodiment.

The automatic scroll processing IV shown in FIG. 18 is processing for executing display in the sequence of the normal display→zoom-in display→scroll display→zoom-out display→normal display, for each image data, in the event of displaying still image data which is a plurality of data to be displayed in a sequentially continuous manner.

In the event of slide show playback, in step F201 the control unit 11 performs image selection. Specifically, image data PCT is stored in the image storage unit 10 for each folder for example, but the control unit 11 selects one image data PCT as a display object out of the folder specified by the user's operations, for example, as this-time slide show object. This selection may sequentially be performed in a predetermined sequence, or may randomly be performed. It goes without saying that in the event that multiple folders have been specified, image data PCT has to be selected with the multiple folders as an object.

Also, in the event that the user has arbitrarily selected a plurality of image data PCT instead of folder specification as a slide show object, the control unit 11 selects one image data PCT out of the plurality of image data PCT selected by the user.

Upon selecting one image data PCT, in step F202 and thereafter, the control unit 11 performs display control regarding the selected image data PCT.

First, the control unit 11 executes the normal display as step F202. Specifically, the control unit 11 reads out the selected still image data from the image storage unit 10, and transfers to the display signal output unit 12. The control unit 11 then instructs the normal display such as FIG. 8A, for example.

The control unit 11 executes this normal display for a predetermined period (e.g., two or three seconds or so), for example. Subsequent to the normal display thereof, in step F203, the control unit 11 then instructs the display signal output unit 12 zoom-in display. For example, the control unit 11 executes display such as FIG. 8A→FIG. 8B→FIG. 8C→FIG. 9A. Control for zoom-in display in this step F203 is performed such as the above FIG. 12A, for example.

Upon zoom-in being completed, in step F204 the control unit 11 continuously starts scroll display. The control unit 11 executes this scroll display with a zoom-in completed position within an image as a scroll start position. The control unit 11 executes scroll of display images, for example, such as FIG. 9A→FIG. 9B→FIG. 9C→ . . . →FIG. 10A→FIG. 10B→FIG. 10C.

During execution of scrolling, in step F205 the control unit 11 monitors end of scrolling. Also, in step F206, the control unit 11 monitors a trigger of the manual mode.

In the event of having detected the user's operations as a manual mode trigger, the control unit 11 proceeds to step F207, and performs the processing in the manual mode. This is processing such as the above FIG. 13A or FIG. 13B.

For example, like FIG. 10C, upon the screen display being scrolled up to the right edge ER of the panoramic image data, the control unit 11 determines to be scroll end. In this case, the control unit 11 proceeds from step F205 to step F208, and instructs the display signal output unit 12 stop of scrolling.

Then, in step F209 the control unit 11 executes zoom-out display. In this case, the control unit 11 executes zoom-out display from the scroll end position to the normal display, for example, such as FIG. 10C→FIG. 11A→FIG. 11B→FIG. 11C.

Control for zoom-out display performed in step F209 is performed such as the above FIG. 12B. Upon the display state returning to the normal display due to completion of zoom-out, the control unit 11 determines end of the slide show. For example, the control unit 11 determines end of the slide show when playback display of all the image data PCT within the folder as a slide show object at the image storage unit 10 has made one round. Alternatively, in the event that the user has specified a plurality of image data PCT as slide show objects, the control unit 11 determines end of the slide show when playback display of each image data PCT has made one round.

Also, in the event of determining that the slide show is continuously executed until the user performs end operations, it can also be conceived that determination in step F210 is not performed.

Note that, though not shown in the flowchart in FIG. 18, in the event that the user has performed operations for ending the slide show at slide show execution process, the slide show has to be finished at the time.

Upon determining end of the slide show, in step F210 the control unit 11 ends a series of slide show playback processing.

In the event of the slide show being continued, the control unit 11 returns to step F201, selects the next image data PCT to be displayed, and proceeds to step F202 and thereafter.

As described above, with the present example, in the event of slide show playback, automatic scroll display in the sequence of the normal display, zoom-in, scroll, zoom-out, and normal display is performed regarding each image data.

Thus, for example, with slide show playback using still image data which is a panoramic image, suitable display can be provided to the user.

Specifically, the entirety of the panoramic image is displayed before zoom-in and after zoom-out, whereby the user can recognize the entire image regarding each image data sequentially as a display object.

Moving to the scroll start position by zoom-in facilitates the user to recognize which portion of the entire image the scroll start position is.

Performing scroll allows the user to view each portion in detail.

Also, performing zoom-out from the scroll end position to the normal display allows the user to tell completion of scrolling.

Further, connecting between the normal display and scroll display by zoom-in and zoom-out smoothly changes a series of display, providing an amusing and good-looking appearance. In particular, each image that is sequentially displayed is smoothly changed on display, and accordingly, viewability of slide show playback improves.

The manual mode processing is also performed at slide show playback process, thereby improving the user's arbitrary operability, whereby display according to the user's demands can be performed at the time of slide show playback. Further, the slide show is resumed at the time of end of the manual mode, and accordingly, a series of slide show playback is not prevented.

Note that, as for the user's operations during slide show playback, for example, it can also be conceived to enable a feeding operation to the next image data or previously displayed image data. For example, an arrangement may be made wherein upon a feeding operation being performed at the time of executing automatic scroll display regarding certain image data, the control unit 11 immediately returns to step F201, selects the previous and subsequent image data, and proceeds to step F202 and thereafter.

Also, in the event of slide show playback as well, the scroll start position Ps (zoom-in target position), scroll end position Pe (zoom-out start position), and scroll direction in the automatic scroll processing of each image data can variously be conceived as described in FIGS. 15A through 15G.

In particular, with slide shows, the following example is suitable. First, it can be conceived to determine scroll start/end positions according to the panoramic imaging direction information at the time of imaging regarding each image data. Thus, directionality at the time of panoramic imaging regarding each image can be informed to the user.

Also, the scroll start/end positions regarding each image data may all be unified. For example, the operation in FIG. 15A is applied to all image data, whereby slide show playback along with automatic scroll display having sensation of unity can be provided.

Also, the scroll start/end positions regarding each image data may alternately be changed. For example, the operations in FIGS. 15A and 15B are applied to each image data. Alternatively, regarding each image data, sequentially changing, or randomly selecting a great number of operation patterns such as shown in FIGS. 15A through 15G can be conceived. According to these, diversified slide show playback can be provided.

11. Automatic Scroll Processing V According to Fifth Embodiment

Automatic scroll processing V as the fifth embodiment will be described with reference to FIG. 19.

Figure 19:
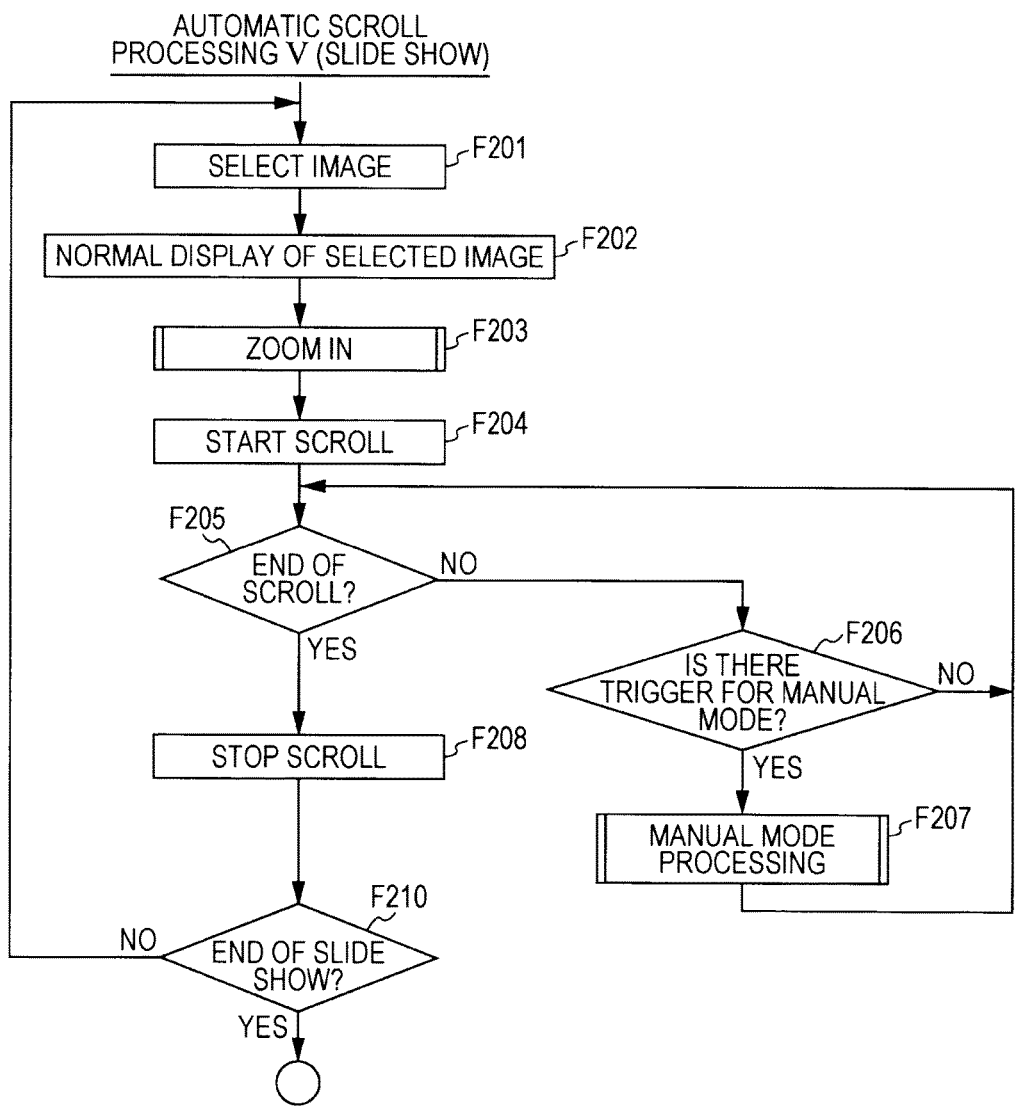
FIG. 19 is a flowchart of automatic scroll processing V according to an embodiment.

The automatic scroll processing V shown in FIG. 19 is processing for performing image display in the sequence of the normal display→zoom-in display→scroll display as automatic scroll display at the time of slide show playback.

Note that in FIG. 19, the same processing as with FIG. 18 is denoted with the same step number, and redundant description thereof will be avoided. The processing in steps F201 through F208 is the same as with FIG. 18.

With the automatic scroll processing V as to each image data in this case, in the event of having reached end of scrolling in step F205, the control unit 11 stops scroll in step F208, returns to step F201 as it is, selects the next image data PCT, and performs the normal display in step F202. That is to say, this processing is processing for immediately switching to the next image data PCT display without performing zoom-out after end of scrolling.

According to automatic scroll display of the present processing example as well, suitable display can be provided to the user, for example, with display of still image data which is a panoramic image.

In particular, the present processing example is suitable for a case where the user wants to quickly perform switching to the next image by skipping zoom-out after end of scrolling.

12. Automatic Scroll Processing VI According to Sixth Embodiment

Automatic scroll processing VI as the sixth embodiment will be described with reference to FIG. 20.

Figure 20:
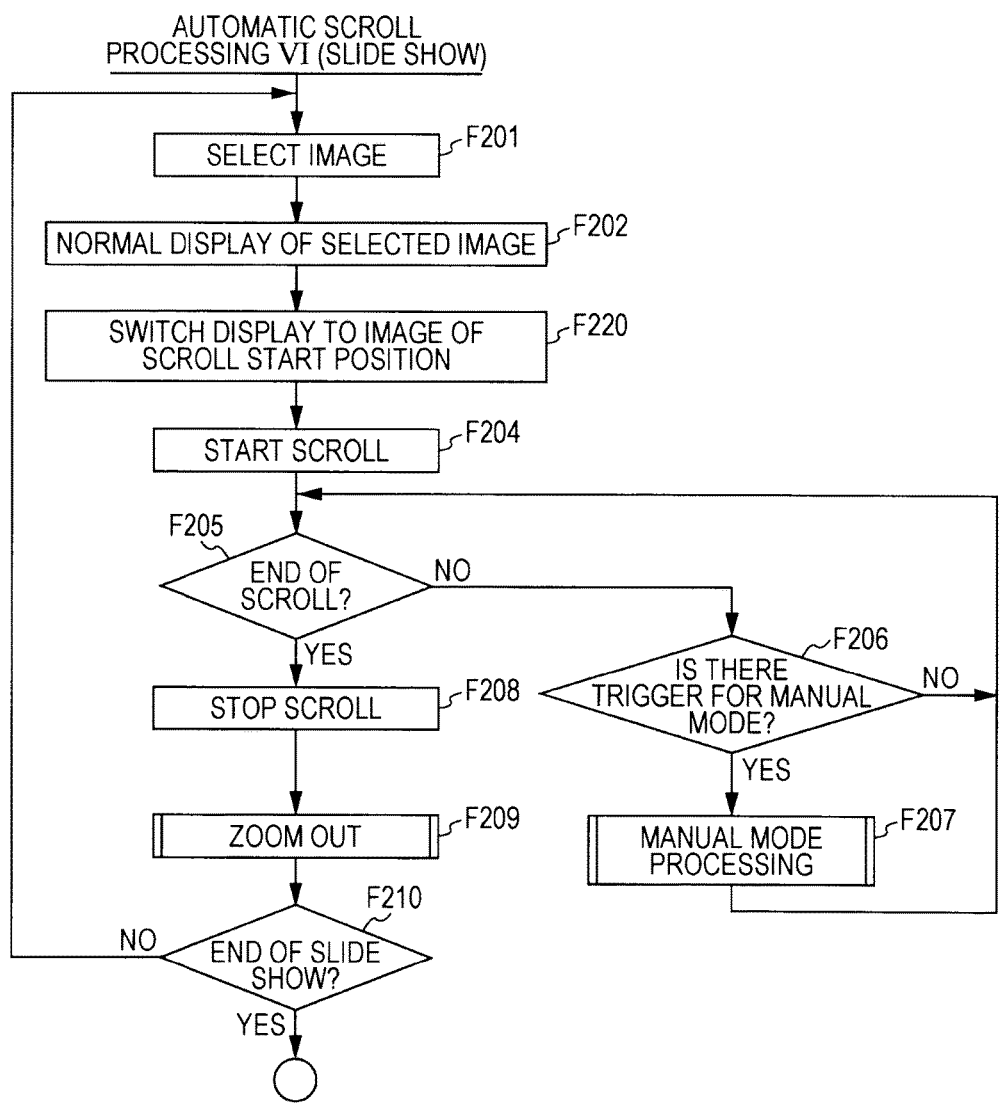
FIG. 20 is a flowchart of automatic scroll processing VI according to an embodiment.

The automatic scroll processing VI shown in FIG. 20 is processing for performing image display in the sequence of the normal display→scroll display→zoom-out display→normal display as automatic scroll display at the time of slide show playback. Note that in FIG. 20, the same processing as with FIG. 18 is denoted with the same step number, and redundant description thereof will be avoided.

The control unit 11 selects image data PCT in step F201, and executes the normal display in step F202. For example, upon executing the normal display for several seconds, in step F220 the control unit 11 instructs the display signal output unit 12 display switching to the image in the scroll start position. For example, the control unit 11 performs control for switching from the state in FIG. 8A to the state in FIG. 9A. That is, the control unit 11 does not perform zoom-in.

The control unit 11 then starts scroll display in step F204. Steps F204 through F210 are the same as with FIG. 18.

According to automatic scroll display in this case as well, suitable display can be provided to the user, for example, with display of still image data which is a panoramic image.

In particular, the present processing example is suitable for a case where it is prioritized that scrolling is immediately started regarding each image in a slide show by preventing zoom-in before start of scrolling.

13. Automatic Scroll Setting Processing

Description has been made so far regarding the automatic scroll processing I, II, and III in the event of single image display for displaying one image selected by the user, and the automatic scroll processing IV, V, and VI in the event of slide show playback. In particular, the automatic scroll processing IV, V, and VI are taken as examples to be applied to display of each image data with the automatic scroll processing I, II, and III sequentially as display objects, respectively.

However, it can be conceived as a display control device according to the present embodiment to switch an operation setting between the case of single image display and the case of slide show playback. Hereafter, such an operation will be described.

Figure 21:
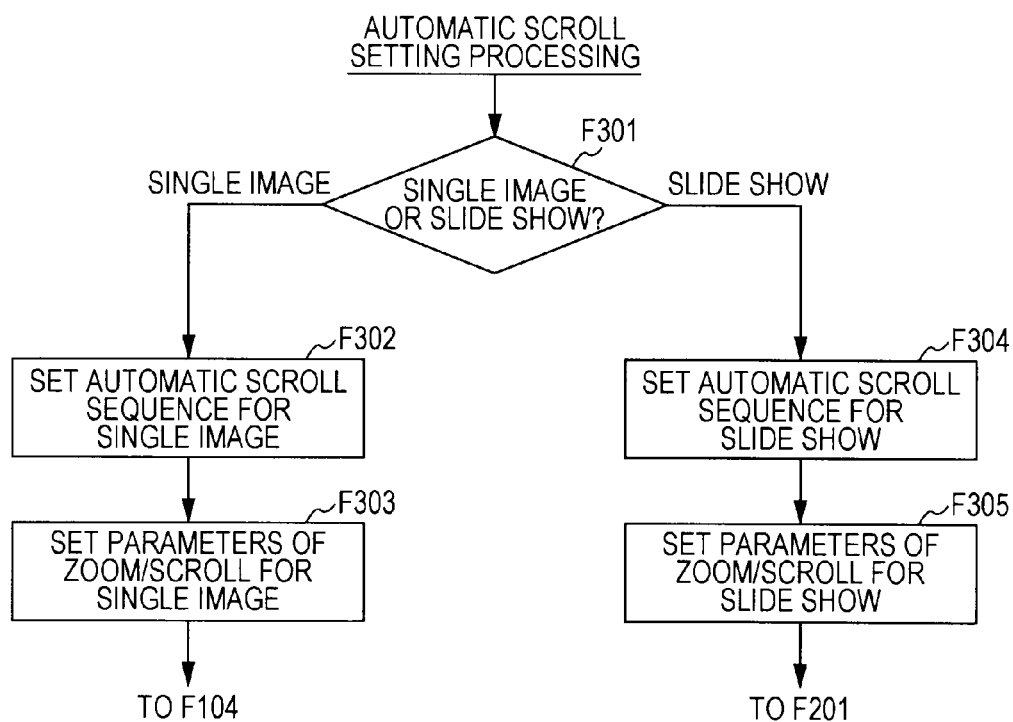
FIG. 21 is a flowchart of automatic scroll setting processing according to an embodiment.

FIG. 21 illustrates automatic scroll setting processing by the control unit 11. This is a processing example for performing an operation setting regarding each of the case of performing single image display, and the case of performing slide show playback.

The control unit 11 performs the setting processing in FIG. 21, for example, whenever executing display control. Specifically, in step F301, with the control unit 11, the processing branches depending on whether the processing to be executed thereafter is single image display or slide show display.

In the event of performing single image display, in step F302 the control unit 11 sets the sequence of an automatic scroll operation for a single image. Further, in step F303, the control unit 11 sets the parameters of zoom/scroll display for a single image.

The control unit 11 then proceeds to step F104 in FIG. 6, 16, or 17, and performs automatic scroll control as signal image display.

On the other hand, in the event of performing slide show playback, in step F304 the control unit 11 sets the sequence of an automatic scroll operation for a slide show. Further, in step F305, the control unit 11 sets the parameters of zoom/scroll display for a slide show.

The control unit 11 then proceeds to step F201 in FIG. 18, 19, or 20, and performs execution control of slide show playback.

With the processing in FIG. 21, the sequence of an automatic scroll operation is set in steps F302 and F304, but the following examples can be conceived as the setting processing in steps F302 and F304.

Setting Example 1

Setting is performed so as to execute the automatic scroll processing I (FIG. 6) as for a single image, and so as to execute the automatic scroll processing V (FIG. 19) as for a slide show.

Setting Example 2

Setting is performed so as to execute the automatic scroll processing I (FIG. 6) as for a single image, and so as to execute the automatic scroll processing VI (FIG. 20) as for a slide show.

Setting Example 3

Setting is performed so as to execute the automatic scroll processing II (FIG. 16) as for a single image, and so as to execute the automatic scroll processing IV (FIG. 18) as for a slide show.

Setting Example 4

Setting is performed so as to execute the automatic scroll processing II (FIG. 16) as for a single image, and so as to execute the automatic scroll processing VI (FIG. 20) as for a slide show.

Setting Example 5

Setting is performed so as to execute the automatic scroll processing III (FIG. 17) as for a single image, and so as to execute the automatic scroll processing IV (FIG. 18) as for a slide show.

Setting Example 6

Setting is performed so as to execute the automatic scroll processing III (FIG. 17) as for a single image, and so as to execute the automatic scroll processing V (FIG. 19) as for a slide show.

According to the settings of these (Setting example 1) through (Setting example 6), an automatic scroll operation is executed in accordance with a different sequence between the case of single image display and the case of slide show playback. Further, the following examples can be conceived.

Setting Example 7

Setting is performed so as to select one of the automatic scroll processing I (FIG. 6), II (FIG. 16), and III (FIG. 17) for each image data as for a single image, and so as to execute the automatic scroll processing IV (FIG. 18) as for a slide show. Selection of the automatic scroll processing sequences at the time of single image display may be performed at random, in a predetermined sequence, or according to the user's setting, or the like.

Setting Example 8

Setting is performed so as to select one of the automatic scroll processing I (FIG. 6), II (FIG. 16), and III (FIG. 17) for each image data as for a single image, and so as to execute the automatic scroll processing V (FIG. 19) as for a slide show.

Setting Example 9

Setting is performed so as to select one of the automatic scroll processing I (FIG. 6), II (FIG. 16), and III (FIG. 17) for each image data as for a single image, and so as to execute the automatic scroll processing VI (FIG. 20) as for a slide show.

Setting Example 10

Setting is performed so as to execute the automatic scroll processing I (FIG. 6) as for a single image, and so as to select the processing (automatic scroll processing sequence) in steps F202 through F210 of the automatic scroll processing IV (FIG. 18), V (FIG. 19), and VI (FIG. 20) for each image as for a slide show. Selection of the automatic scroll processing sequences at the time of slide show playback may be performed at random, in a predetermined sequence, or according to the user's setting, or the like.

Setting Example 11

Setting is performed so as to execute the automatic scroll processing II (FIG. 16) as for a single image, and so as to select the processing (automatic scroll processing sequence) in steps F202 through F210 of the automatic scroll processing IV (FIG. 18), V (FIG. 19), and VI (FIG. 20) for each image as for a slide show.

Setting Example 12

Setting is performed so as to execute the automatic scroll processing III (FIG. 17) as for a single image, and so as to select the processing (automatic scroll processing sequence) in steps F202 through F210 of the automatic scroll processing IV (FIG. 18), V (FIG. 19), and VI (FIG. 20) for each image as for a slide show.

Setting Example 13

Setting is performed so as to select one of the automatic scroll processing I (FIG. 6), II (FIG. 16), and III (FIG. 17) for each image data as for a single image, and so as to select the processing (automatic scroll processing sequence) in steps F202 through F210 of the automatic scroll processing IV (FIG. 18), V (FIG. 19), and VI (FIG. 20) for each image sequentially displayed as for a slide show.

With the settings of these (Setting example 7) through (Setting example 13), in the event of slide show playback, a part of image data to be sequentially displayed may have an automatic scroll operation sequence differ from single image display.

Also, with the processing in FIG. 21, the parameters of a zoom operation and a scroll operation at the time of automatic scroll operations are set in steps F303 and F305, but the following examples can be conceived.

First, with regard to the scroll start position (zoom-in target position) and scroll end position (zoom-out start position), as described in FIGS. 15A through 15G, various types of examples can be conceived, but it can be conceived to have a different setting between the case of single image display and the case of slide show playback.

For example, in the event of single image display, setting is performed so as to determine the scroll start position/end position according to the panoramic imaging direction information, but in the event of slide show playback, setting is performed so as to fix the scroll start position/end position regarding each image data.

Also, it can be conceived to change speed settings of zoom-in and zoom-out between the case of single image display and the case of slide show playback. For example, in the event of single image display, zoom-in/zoom-out is performed in a relatively slow speed, and in the event of slide show playback, zoom-in/zoom-out regarding each image data is performed in a relatively high speed. The same can also be applied to scroll speed.

Also, it can also be conceived that in the event of single image display, the zoom speed and scroll speed are fixedly set, but are variably set at the time of music playback of a slide show. For example, at the time of slide show playback, in the event of performing background music playback, the zoom speed and scroll speed are set according to the tempo of the music or the like.

As with the above examples, the automatic scroll operation sequence, and the parameters of zoom/scroll are changed between the case of single image display and the case of slide show playback, whereby image display suitable for each case or suitable for the user's preference can be realized.

14. Scroll within Valid Image Range

With automatic scroll control described so far, it is suitable to perform processing with a valid image range where the content of an imaged image in panoramic image data or the like, i.e., a subject image exists as an object.

Figure 7B:
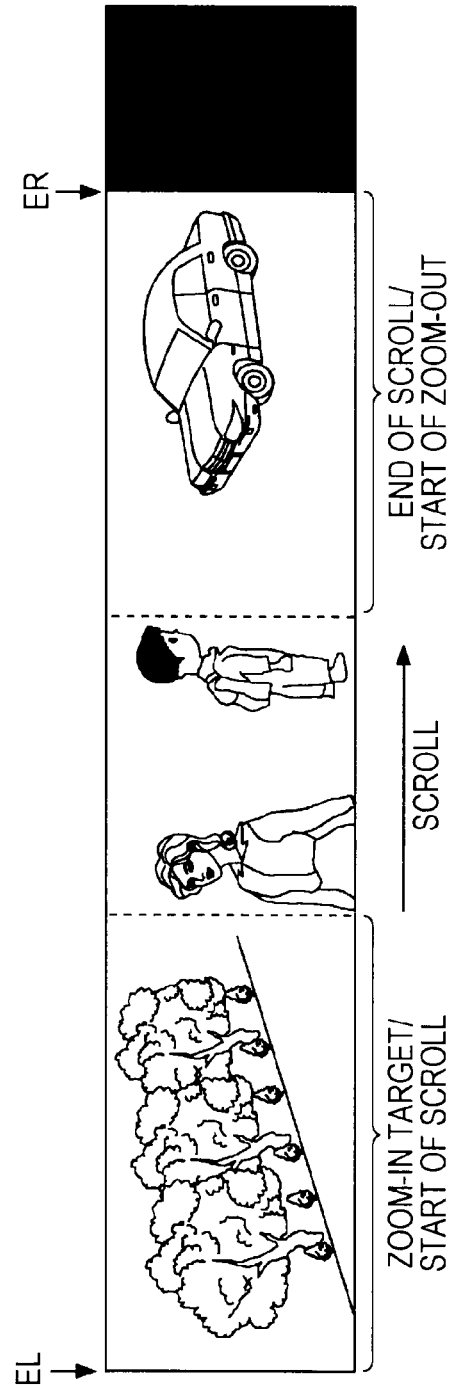

For example, let us consider panoramic image data such as FIG. 7B. Let us say that when the user performed panoramic imaging, imaging was not performed with a stipulated angle range, for example. For example, with an imaging apparatus wherein the angle range for panoramic image data is stipulated as 210 degrees, the user has performed panoramic imaging only with a range of 180 degrees. Thus, there may be a case where image data of which the right edge is a region where the imaged image of a subject does not exist, as shown in the drawing. Alternatively, there may be a case where image data having a region where no such subject exists is generated by image data editing or the like.

Upon automatic scroll display being performed on such panoramic image data in a range from the left edge to the right edge, a portion where no subject exists is excessively displayed. Therefore, it is suitable to perform the automatic scroll processing with a valid image range as an object.

The control unit 11 determines a valid image range by image analysis regarding image data to be displayed, and determines the edge portion of a display region.

For example, as shown in FIG. 7B, edge portions serving as a valid image range are taken as a left edge EL, and a right edge ER from which a non-image region is excluded. With this valid image range, the scroll start position/end position is set, and accordingly, an automatic scroll operation excluding the non-image region is performed.

Specifically, as shown in FIG. 22A, after the normal display is performed, zoom-in is performed with the portion of the left edge EL side of the panoramic image data as a target, and display proceeds to a display state in FIG. 22B. Scrolling is then started. The scrolling thereof is ended in a state of FIG. 22C reaching the right edge ER in the valid image range, and zoom-out is performed from this state.

In this way, zoom-in/scroll/zoom-out is performed with the valid image range as an object excluding a non-image region, and accordingly, useless scroll, unspectacular display due to a zoom operation on a non-image portion can be eliminated.

15. Modifications

The configuration and operations of the display control device according to an embodiment of the present disclosure is not restricted to the above embodiments, and various modifications can be conceived.

A zoom-in operation has been described, as shown in FIG. 9A, wherein the zoom scale is changed until the size of the image in the scroll start position becomes a size where the image is displayed on the entire screen, but an example can also be conceived wherein zooming is performed until the scale further increases, or zoom-in is ended before the size of the image becomes a size where the image is displayed on the entire screen.

Figure 23A:
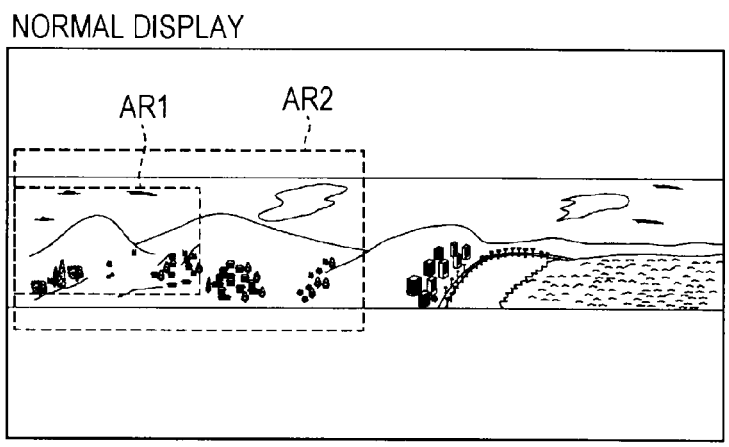
FIGS. 23A through 23C are explanatory diagrams of an example of zoom-in completed state according to an embodiment.

For example, FIG. 23A illustrates the state of the normal display, which is an example wherein zoom-in is performed with a region AR1 and a region AR2 indicated by a dashed line as targets.

Figure 23B:
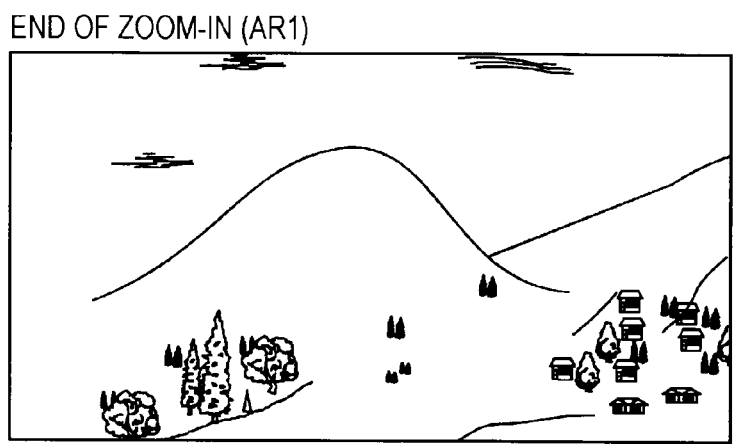

A case where the region AR1 being taken as a target is an example wherein zoom-in is ended in a state in which the zoom scale is further increased as compared to the case shown in FIG. 9A. As shown in FIG. 23B, zoom-in is ended in a state in which the scale is increased until a portion of the screen vertical edges disappears.

Figure 23C:
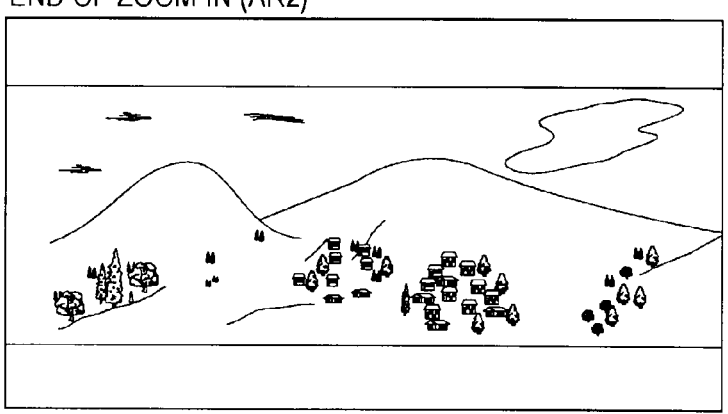

A case where the region AR2 being taken as a target is an example wherein zoom-in is ended before the scale reaches the scale shown in FIG. 9A. As shown in FIG. 23C, the entire screen is not a subject image, and non-image belt portions are caused above and below.

It can also be conceived that zoom-in is ended in a state such as in FIG. 23B or FIG. 23C for example, and then scrolling is performed without changing the scale thereof. Also, zoom speed may be changed during zoom-in/zoom-out.

For example, at the time of zoom-in, between the normal image to end of zoom-in, the speed of zoom scale change is changed such that the first half is fast, and slow toward the second half. Thus, display can be realized such that landing to a target image is performed with lenience while moving to the scroll start position from a distant view at high speed.

Also, conversely, between the normal image to end of zoom-in, the speed of zoom scale change is changed such that the first half is slow, and fast toward the second half. Thus, display can be realized so as to close in the image in the scroll start position. This may be applied to the case of zoom-out. Also, zoom speed may be set at random, or may be selected by the user.

Also, in the event that a display object is 3D image data, it can be conceived to perform disparity adjustment as processing at the time of zoom-in/zoom-out. The disparity in this case means displacement of an amount equivalent to the distance between the image for the right eye and the image for the left eye, the disparity thereof being changed according to distance. Accordingly, at the time of zoom-in/zoom-out, the disparity is changed according to the distance (scale) thereof, whereby more natural zoom-in/zoom-out display can be realized as a 3D image.

Also, the sequence or parameters of an automatic scroll operation may be switched according to a 2D image and a 3D image.

Also, with each automatic scroll processing example according to an embodiment, an arrangement has been made wherein the user's operations can be handled during scroll as the manual mode, but an example can also be conceived wherein no manual mode is provided. Also, the case of single image display may be compatible with the manual mode, and the case of slide show playback may be incompatible with the manual mode. It goes without say that the opposite thereof may be true.

With the above embodiments, an automatic scroll operation has been described particularly as the display of panoramic image data, but with regard to the still image data of a normal size, and still image data of a panoramic images size, the automatic scroll processing may be applied to both, or the automatic scroll processing may be executed only when the still image data of a panoramic size is taken as a display object.

Also, the automatic scroll processing may also be performed at the time of display of moving image data or text data, further at the time of display of various types of application images, at the time of file browsing, website image browsing, or the like, regardless of still image data.

16. Program

A program according to an embodiment is, at the time of displaying data to be displayed on a display unit, a program of a processing unit for controlling output of display image signals to the display unit. Specifically, this is a program causing a processing unit (control unit 11 or the like) such as CPU or the like to execute automatic scroll processing of one of FIGS. 6, 16, 17, 18, 19, and 20.

The program according to an embodiment causes the processing unit to execute: zoom-in display in the scroll start position from the normal display regarding data to be displayed; scroll display from the scroll start position; and zoom-out display from the scroll end position to the normal display.

Alternatively, the program according to an embodiment causes the processing unit to execute: zoom-in display from the normal display to the scroll start position regarding data to be displayed; and scroll display from the scroll start position.

Alternatively, the program according to an embodiment causes the processing unit to execute: scroll display from the scroll start position regarding data to be displayed; and zoom-out display from the scroll end position to the normal display.

The programs according to the present embodiment may be recorded in an HDD serving as a recording medium which is housed in a device such as the imaging apparatus 100, recording/playback device 101, personal computer 102, game machine 103, monitor device 104, or the like shown in FIGS. 1A through 1E, or ROM within a microcomputer including a CPU, or the like beforehand.

Alternatively, the program according to an embodiment may be temporarily or eternally stored (recorded) in a removable recording medium such as a flexible disk, CD-ROM (Compact Disc Read Only Memory), MO (Magneto-optical) disk, DVD (Digital Versatile Disc), Blu-ray disc, magnetic disk, semiconductor memory, memory card, or the like. Such a removable recording medium may be provided as a so-called package software.

Also, the program according to an embodiment may be installed into a personal computer or the like from the removable recording medium, and also may be downloaded from a download site via a network such as a LAN (Local Area Network), the Internet, or the like. The program according to an embodiment is suitable for realizing and widely providing a display control device and a display control method for executing automatic scroll processing according to the above embodiment.

The present disclosure contains subject matter related to that disclosed in Japanese Priority Patent Application JP 2010-154428 filed in the Japan Patent Office on Jul. 7, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device, comprising:
    circuitry configured to:
    output a first display image signal on a display screen to display a panoramic image;
    zoom-in a first display of said panoramic image to a second display that corresponds to a scroll-start position which is within said panoramic image, wherein said zoom-in of said first display to said second display is based on a plurality of zoom levels;
    display at least a trimmed part of said panoramic image at each zoom level of said plurality of zoom levels of said zoom-in of said first display;
    automatically scroll said second display of said panoramic image from said scroll-start position based on an aspect ratio of said panoramic image which is equal to or greater than a threshold ratio;
    output a second display image signal to interrupt said scroll of said second display;
    display said panoramic image based on an operation input as a manual mode,
    wherein in said manual mode, a display position in said panoramic image is changed while said scroll of said second display is executed;
    determine a resume position in said panoramic image based on a movement amount of said display position on said display screen by said operation input;
    resume said scroll from said resume position within said panoramic image, based on at least one of an end of said manual mode or an elapsed time in said manual mode; and
    zoom-out a third display of at least a portion of said panoramic image from a scroll-end position within said panoramic image to said first display of said panoramic image,
    wherein one of said zoom-in of said first display or said zoom-out of said third display is executed at a first speed in a single image display of said panoramic image, and wherein said first speed is different from a second speed in a slide show of a plurality of images.

2. The display control device according to claim 1, wherein said scroll-start position is a first edge position in still image data of said panoramic image, and
wherein said scroll-end position is a second edge position opposite to said first edge position in said still image data of said panoramic image.

3. The display control device according to claim 2, wherein said first edge position corresponds to an imaging start side at a time of capture of panoramic data that corresponds to said still image data.

4. The display control device according to claim 3, wherein said first edge position and said second edge position are image edge positions in a valid image range where said panoramic image is displayed.

5. The display control device according to claim 1, wherein for said slide show of said plurality of images, said circuitry is further configured to sequentially execute said zoom-in of said first display, said scroll of said second display, and said zoom-out of said third display.

6. The display control device according to claim 1, wherein for said slide show of said plurality of images, said circuitry is further configured to sequentially execute said zoom-in of said first display and said scroll of said second display.

7. The display control device according to claim 1, wherein for said slide show of said plurality of images, said circuitry is further configured to sequentially execute said scroll of said second display and said zoom-out of said third display.

8. A display control method, comprising:
    outputting a display image signal on a display screen to display a panoramic image;
    zooming-in a first display of said panoramic image to a second display that corresponds to a scroll-start position which is within said panoramic image, wherein said zooming-in of said first display to said second display is based on a plurality of zoom levels;
    displaying at least a trimmed part of said panoramic image at each zoom level of said plurality of zoom levels of said zooming-in of said first display;

automatically scrolling said second display of said panoramic image from said scroll-start position based on an aspect ratio of said panoramic image which is equal to or greater than a threshold ratio;

outputting a second display image signal to interrupt said scroll of said second display;

displaying said panoramic image based on an operation input as a manual mode, wherein in said manual mode, a display position in said panoramic image is changed while said scroll of said second display is executed;

determining a resume position in said panoramic image based on a movement amount of said display position on said display screen by said operation input;

resuming said scroll from said resume position within said panoramic image, based on at least one of an end of said manual mode or an elapsed time in said manual mode; and zooming-out a third display of at least a portion of said panoramic image from a scroll-end position within said panoramic image to said first display of said panoramic image, wherein one of said zoom-in of said first display or said zoom-out of said third display is executed at a first speed in a single image display corresponding to said panoramic image, wherein said first speed is different from a second speed in a slide show of a plurality of images.

9. A non-transitory computer-readable medium having stored thereon, computer-executable instructions, which when executed by a computer, cause said computer to execute operations, said operations comprising:

outputting a display image signal on a display screen so as to display a panoramic image;

zooming-in a first display of said panoramic image to a second display that corresponds to a scroll-start position which is within said panoramic image, wherein said zooming-in of said first display to said second display is based on a plurality of zoom levels;

displaying at least a trimmed part of said panoramic image at each zoom level of said plurality of zoom levels of said zooming-in of said first display;

automatically scrolling said second display of said panoramic image from said scroll-start position based on an aspect ratio of said panoramic image which is equal to or greater than a threshold ratio;

outputting a second display image signal to interrupt said scroll of said second display;

displaying said panoramic image based on an operation input as a manual mode, wherein in said manual mode, a display position in said panoramic image is changed while said scroll of said second display is executed;

determining a resume position in said panoramic image based on a movement amount of said display position on said display screen by said operation input;

resuming said scroll from said resume position within said panoramic image, based on at least one of an end of said manual mode or an elapsed time in said manual mode; and zooming-out a third display of at least a portion of said panoramic image from a scroll-end position within said panoramic image to said first display of said panoramic image, wherein one of said zoom-in of said first display or said zoom-out of said third display is executed at a first speed in a single image display corresponding to said panoramic image, wherein said first speed is different from a second speed in a slide show of a plurality of images.

\* \* \* \* \*